(12) United States Patent
Williams

(10) Patent No.: US 12,311,713 B2
(45) Date of Patent: May 27, 2025

(54) ROAD TO RAIL HYBRID VEHICLES USING A TRANSITION SPAN AND PASSIVE JUNCTIONS

(71) Applicant: Thomas Holtzman Williams, Longmont, CO (US)

(72) Inventor: Thomas Holtzman Williams, Longmont, CO (US)

( * ) Notice: Subject to any disclaimer, the term of this patent is extended or adjusted under 35 U.S.C. 154(b) by 63 days.

(21) Appl. No.: 18/383,894

(22) Filed: Oct. 25, 2023

(65) Prior Publication Data

US 2025/0135814 A1 May 1, 2025

(51) Int. Cl.
| | | |
|---|---|---|
| *B60F 1/02* | (2006.01) | |
| *B60F 1/00* | (2006.01) | |
| *B60F 1/04* | (2006.01) | |
| *B62D 1/26* | (2006.01) | |
| *E01B 25/00* | (2006.01) | |
| *E01B 25/28* | (2006.01) | |

(52) U.S. Cl.
CPC ............... *B60F 1/02* (2013.01); *B60F 1/00* (2013.01); *B60F 1/005* (2013.01); *B60F 1/04* (2013.01); *B62D 1/265* (2013.01); *E01B 25/00* (2013.01); *E01B 25/28* (2013.01)

(58) Field of Classification Search
CPC .... B60F 1/00; B60F 1/005; B60F 1/02; B60F 1/04; B60F 2301/10; B62D 1/265; E01B 25/00; E01B 25/28; B61B 15/00
USPC ........................................ 105/215.2; 246/427
See application file for complete search history.

(56) References Cited

U.S. PATENT DOCUMENTS

| | | | | |
|---|---|---|---|---|
| 2,042,265 A | * | 5/1936 | Main ......................... | B60F 1/02 |
| | | | | 104/247 |
| 3,831,527 A | * | 8/1974 | Peterson .................. | B61L 11/02 |
| | | | | 105/215.1 |
| 4,224,875 A | * | 9/1980 | Knippel .................... | E01B 7/00 |
| | | | | 246/469 |
| 5,531,409 A | | 7/1996 | Turno | |
| 6,324,994 B1 | * | 12/2001 | Glenn ....................... | B62M 6/75 |
| | | | | 105/72.2 |
| 11,230,813 B1 | * | 1/2022 | Williams .................. | B60F 1/04 |
| 11,364,940 B1 | * | 6/2022 | Williams ................ | B61B 13/00 |
| 2001/0050026 A1 | * | 12/2001 | Esposito .................... | B60F 1/02 |
| | | | | 105/215.2 |

(Continued)

OTHER PUBLICATIONS

IDS1.pdf.

*Primary Examiner* — Zachary L Kuhfuss

(57) ABSTRACT

Described is a hybrid transportation system with hybrid vehicles (H-vehicles) that can travel on pavement (or off-road), then transition to railroad track travel, and then later transition back onto pavement without stopping or requiring an operator to exit the vehicle. At static rail junctions (with no moving switch parts) the H-vehicle selects its outgoing track. Turns at passive junctions are made by applying lateral force which may be applied using multiple methods including side roller diverters and steering. Separate road wheels and rail wheels may be employed on an H-vehicle, or a combination wheel can be used with concentric road and rail wheel components. Combination wheels may be locked together or unlocked with relative rotational angular velocities. Transition between road and rail travel is facilitated using transition spans which connect roads to rails. Improved rail-only vehicles (R-) vehicles and junctions are also described.

27 Claims, 28 Drawing Sheets

(56) References Cited

U.S. PATENT DOCUMENTS

| | | | |
|---|---|---|---|
| 2004/0250724 A1* | 12/2004 | Sobolewski | B60L 13/04 |
| | | | 105/215.1 |
| 2007/0214995 A1* | 9/2007 | Publicover | B60F 1/02 |
| | | | 104/287 |
| 2009/0050011 A1* | 2/2009 | Li | B61B 15/00 |
| | | | 105/215.2 |
| 2010/0211238 A1* | 8/2010 | David, Jr. | B61B 15/00 |
| | | | 701/19 |
| 2010/0294848 A1* | 11/2010 | Bullis | B60B 17/0072 |
| | | | 188/41 |
| 2013/0104769 A1* | 5/2013 | Lebert | B61F 13/00 |
| | | | 105/215.2 |
| 2013/0186297 A1* | 7/2013 | Kissel | E01B 25/08 |
| | | | 104/124 |
| 2021/0237526 A1* | 8/2021 | Williams | B60F 1/04 |
| 2022/0072921 A1* | 3/2022 | Ostrowski | B60B 19/02 |

* cited by examiner

SECTION A-A'

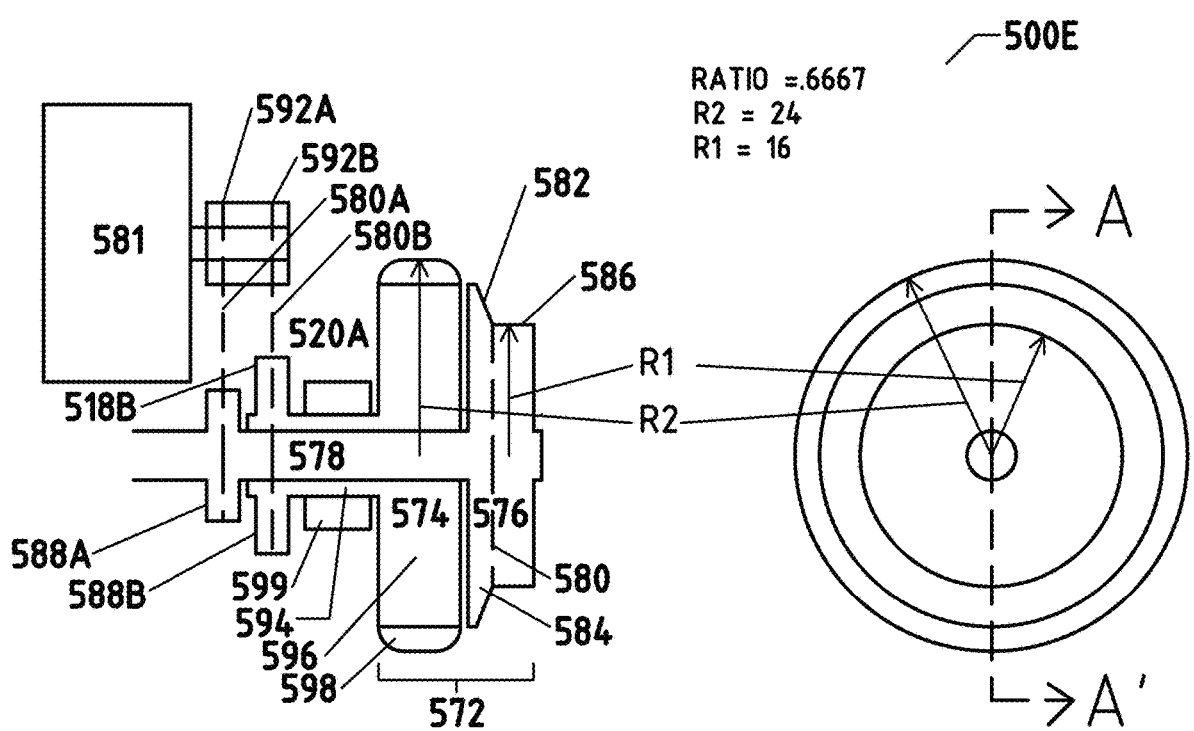

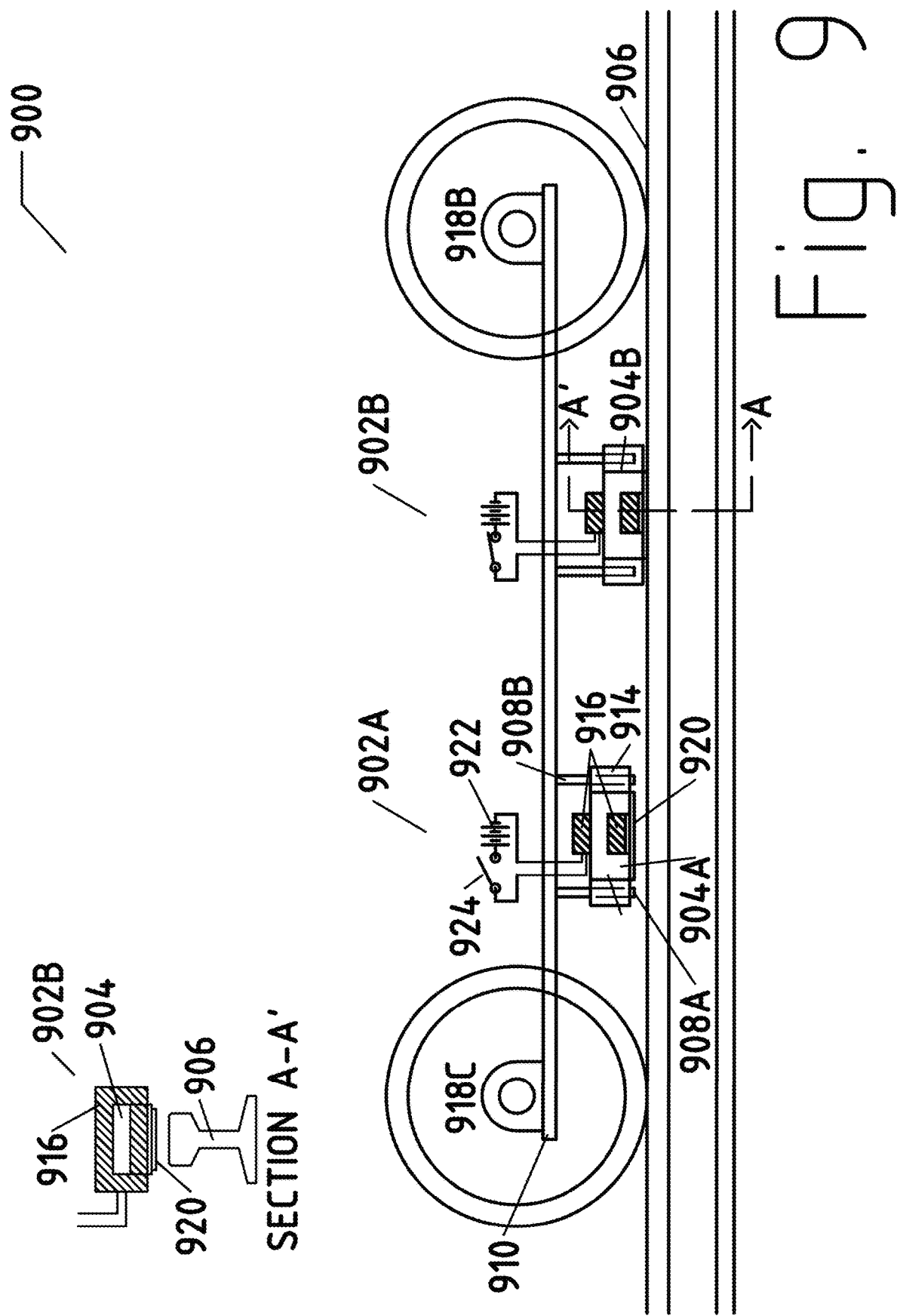

ROAD TO RAIL HYBRID VEHICLES USING A TRANSITION SPAN AND PASSIVE JUNCTIONS

CROSS REFERENCE TO RELATED APPLICATIONS

This application claims benefit and priority of:
U.S. Provisional Patent Application Ser. No. 62/918,544 filed Feb. 4, 2019,
U.S. Non-Provisional patent application Ser. No. 16/780, 015 filed Feb. 3, 2020,
U.S. Non-Provisional patent application Ser. No. 17/072, 664 filed Oct. 16, 2020,
U.S. Provisional Patent Application 63/133,509 filed Jan. 4, 2021.
U.S. Non-Provisional patent application Ser. No. 17/728, 591 filed Apr. 25, 2022
U.S. Provisional patent application Ser. No. 63/531,983 filed Aug. 10, 2023
The disclosures of this application are incorporated herein by reference in their entireties.

FIELD OF THE INVENTION

This invention relates to rail systems in general and to hi-rail (highway-rail) vehicles and track switching systems in particular.

BACKGROUND

Rail vehicles have an advantage over road vehicles of low rolling resistance resulting in dramatically better fuel economy, much lower $CO_2$ emissions and a rail that can provide renewable electric power. Railroads are cheaper to build than highways, safer, use less real estate, and a track can transport a same traffic load as several lanes of a highway. Unfortunately, rails don't go everywhere that people and materials need to go.

Hi-Rail vehicles can travel over both highways and railroad tracks. The railroad wheels are typically located in retractable pairs in the front and back of a vehicle, which may be a maintenance truck. These systems have a bad reputation for safety caused in part by a need for the vehicle operator to exit the vehicle to lower the rail wheels. Frequently, rail mounting occurs in the road at intersections between rail and roads. This is inherently a dangerous location. Lowering rail wheels onto the rail requires precise truck to track alignment so rail wheel flanges align with the insides of the rails. Typically rail wheels on one end of the truck are lowered, the vehicle is re-positioned if necessary, and then the wheels on the other end of the truck are lowered. Cameras may be used to assist a driver with alignment. Typically the hi-rail vehicle's rail wheels are not used for traction, but only to maintain road wheel alignment over said tracks. Road wheels that don't supply traction are often lifted off of the rail to reduce rolling resistance. Two weaknesses of hi-rail vehicles are poor breaking and weak traction force.

In U.S. Pat. No. 11,364,940 a passive system of rails is described with static junctions having no moving components. On-rail vehicles decide which direction to take at a junction by applying lateral force to the vehicle. There are gaps in the junction rails called "flange paths" that allows the vehicle to select its own turn using lateral (or side) force. There are numerous methods of applying side force to the vehicle, including side rollers acting as diverters, magnets, and wheel steering. One feature of this invention is a wider-than-normal tread (cylindrical section) on the rail wheels which provides support while passing over gaps in the rails created by flange paths.

The pursuit of driver-assisted and self-driving cars has resulted in many automotive advancements that can be employed to enable hybrid vehicles. Transitioning between rail and road travel can be made very fast, easy, safe, and automatic.

A personal rapid transit system (PRT) is a hybrid between cars and train service and is designed to transport one to a small number of persons. PRTs usually have a number of characteristics including direct service with few stops. PRT tracks have turnouts so passenger pickup or drop-off does not block thru traffic. PRT systems use computers and communications to coordinate vehicle movement. Technology described in this patent application extends PRT capability with vehicles that can optionally leave the tracks and travel on and off roads using transition spans. The PRT in Morgantown West Virginia, USA is an example of a rail-only PRT system.

An H-vehicle may be used for mass transit, in personal rapid transit (PRT) system, autonomous delivery of material, people, or packages, for a light rail system, or on high-speed rails. It may be used on public infrastructure, private property, or in manufacturing facilities. It may also share tracks with other rail systems.

There is also a nascent recreational industry called rail-biking that uses four-wheeled pedal carts designed to travel on abandoned rails, usually situated on a piece of track with no or fixed junctions. The carts are often made of lightweight material like aluminum and use polyurethane wheels and carry two or four passengers. Sometimes they have a motor assist mechanism. Frequently they follow scenic rail routes with rivers or mountains. They suffer from challenges like an inability to pass, one-way only operation, and difficult turn-around procedures. There are also vehicles that employ a mounted bicycle on one rail and an outrigger wheel on the opposite rail. They also suffer the same limitations as the four-wheeled carts.

Components of a conventional rail wheel consist of a cylindrical portion called a tread and a flange which is used for aligning and maintaining a rail vehicle over a set of tracks. Typically the tread has a small taper used to maintain track alignment. The flange may be described as having a width, a depth, an angled surface for rail contact, and a flange tip. In some embodiments in this invention the width of the road wheel tip is made much wider to mount a road tire, becoming a road wheel tip. In U.S. Pat. No. 11,364,940 a width of the tread can be made wider (than conventional treads) to avoid wheel drop while going over a gap in a rails, which occurs in junctions.

It is an object of this invention to reduce fuel use for transportation and improve safety. It is also an object of this invention to facilitate automatic hybrid vehicle transition between road travel and rail travel safely without a need for a vehicle to stop or for an operator. It is also an object of this invention to allow an H-vehicle to use a same steering mechanism both on rail and on pavement. Another object of this invention to enable a Traffic Control System (TCS) to control H-vehicles while they operate on rails, while it transitions to and from rail travel, and optionally control vehicle operation while on a road (self driving car mode). Another object of this invention to allow the building of rail systems with a tight turning radius on tracks that are navigated by rail vehicles with steering. Another object of this invention is to build a hybrid road-rail systems that utilizes conventional rail wheels having a narrow tread surface.

It is also an object of this invention to get semi-trucks with trailers off of highways and onto railroad tracks using road-rail transition spans, avoiding highway damage and reducing fuel consumption. Tracks may run adjacent to the highways. A standard rail gauge in the USA and in many other countries is 1435 mm.

A problem is that global warming from atmospheric $CO_2$ is threatening the existence of millions of humans on planet Earth. A partial solution is energy conservation for transportation and using energy from renewable sources. These two inventions target the 27.5% of $CO_2$ output from transportation by moving people and materiel from roads to rails. Rail transportation provides dramatically less rolling resistance on steel rails relative to rubber tires.

SUMMARY OF THE INVENTION

A road-rail transportation system using hybrid (H-) vehicles, rails with passive junctions, roads, and transition spans connecting the roads to the rails where a vehicle travels on both roads and rails to reach its destination. Vehicles can use eight wheels with four of the wheels being retractable or 4 combination wheels. Combination wheels can be locked or unlocked.

A rail transportation system with standard rails and passive junctions, rail (R-) vehicles applying lateral force at junctions using steering, the passive junctions having a 6 rail configuration with wide tread wheels on the vehicles or a 4 rail configuration with wheel flange path support surfaces supporting wheels with road wheel tips.

Toy/scale models and full scale applications are anticipated.

DESCRIPTION OF FIGURES

FIG. 5E are side and sectional views of an unlocked combination wheel.
FIG. 9 are side and section view of an electromagnet rail brake.

DESCRIPTION FIG. 1A

FIG. 1 is a top view 100A of a road-rail transportation system. Traditionally road and rail transportation systems operate separately and independently. A vehicle that works well in one mode generally does not work well (or at all) on another. Exceptions include vehicles called a Hi-rail (or highway-rail) vehicles that can adapt to travel in both modes using retractable rail wheels. Hi-rail vehicles are usually modified trucks that are used for rail services. While mounted on rails, the Hi-rail vehicles do not steer: they just follow the tracks. At rail junctions Hi-rail vehicles follow conventional active (non-static) switch settings.

Figure 1A:
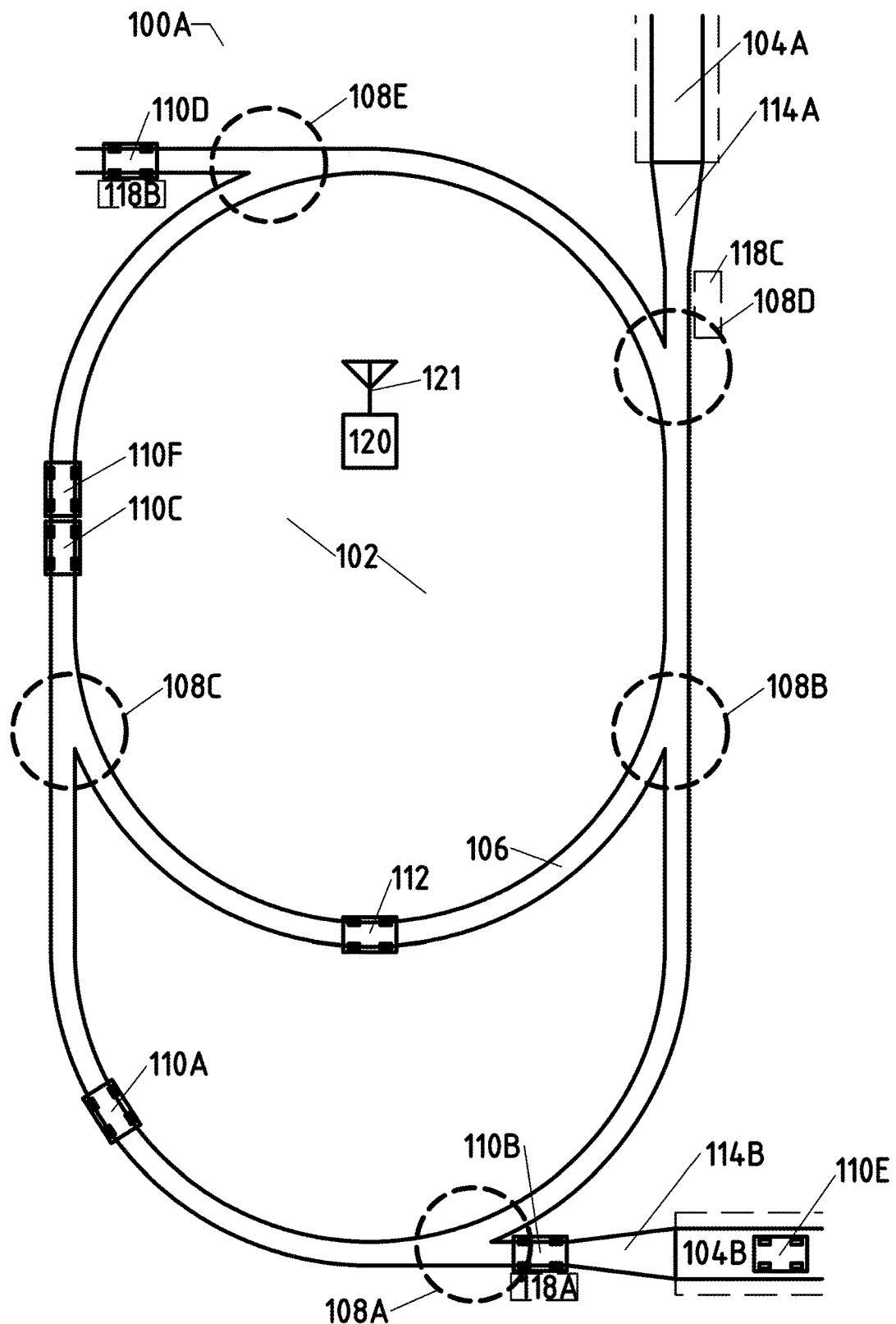
FIG. 1A is a top view of a road-rail transportation system.

The transportation system 102 illustrated in FIG. 1A consists of conventional rails e.g. 106, conventional roads 104A and 104B, passive junctions (or turnouts) 108A-E, transition spans 114A-B between rails and roads, and H-vehicles 110A-110F that can travel over both roads and rails. Passenger loading locations 118A-118C allow people to board vehicles. Rail-only R-vehicle 112 can travel only over rails, but at the passive rail junctions or turnouts the R-vehicle also can decide which way to turn while component parts in a junction below remain static. Illustrated in the transportation system are an H-vehicle on the road 110E, H-vehicles on the rails 110A, 110C and 110F, an H-vehicle 110E entering a junction 108A and an R-vehicle 112 on rails. H-vehicles 110C and 110F are drafting each other to reduce wind resistance. Ideally all traffic is choreographed by a Traffic Control System (TCS) 120 with an antenna 121 while vehicles are on the rails or on transition spans. Wireless communications with vehicles is anticipated. Vehicles may be assigned exclusive moving space-time slots which prevents collisions if every vehicle is in its assigned position.

On rails R-vehicles and H-vehicles apply lateral force to determine direction of travel at junctions. There are multiple methods of applying lateral force as disclosed in U.S. Pat. No. 11,364,940. They include everything from telling a horse pulling an R- or H-vehicle "gee" or "haw" to go left or right, to side roller diverters, to electromagnets, to steering. There are also multiple possible steering methods, which include skid steering, articulated steering, four-wheel steering, crab steering, and Ackermann steering. Steering can use two or four wheels rotating relative to a chassis. In this disclosure, articulated steering is illustrated, but other steering methods work as well. Also, lateral force will be applied using steering, but other methods of applying lateral force also work.

H-vehicles can use their steering both on the rails and on the roads to determine direction of travel. On the road, the steering must be continuous to stay in a lane, but on rails steering may only be required at rail junctions. A non-obvious reason to steer an R- or H-vehicle on a rail is to follow a tight track turn with a small radius without a rail wheel flange contacting an edge of rail. A vehicle with fixed wheels (no steering) will not be able to make as tight of a turn as one employing steering. A tight turn radius means a track or junction location can occupy less real estate.

H-vehicles can mount or dismount the rail using just a transition span such as 114A or turnout with a transition span, such as 108A and 114B. The transition span can connect to the termination of a road. Alternately H-vehicles can use turnouts connected to transitions spans to mount and dismount rails without interrupting rail traffic. Another use for transition spans or turnouts is for pickup or delivery points for passengers, as illustrated at passive junctions 118A-C. This allows passengers to get into an H-vehicle or R-vehicle which can then back onto a rail or go to road travel, depending on passenger destinations. Rail point 118B is a turnout passenger pickup location without a transition span. After picking up a passenger, an H- or R-vehicle would back up onto the rail and continue in rail mode. Alternately the H- or R-vehicles can drive forward onto the trail with an additional junction (not illustrated). H-vehicles can enter a transition span traveling forward or backwards so passengers face forward while traveling.

Figure 7A:
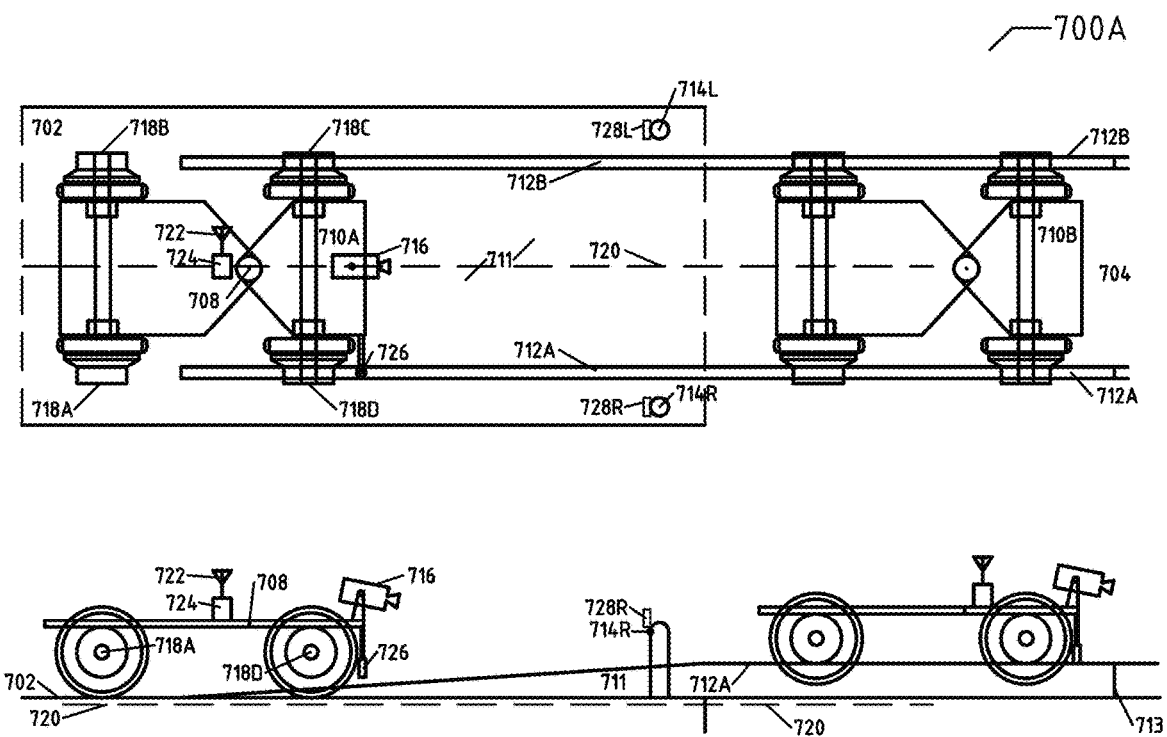
FIG. 7A are top and side view of a first electronic assist transition span.
Figure 7B:
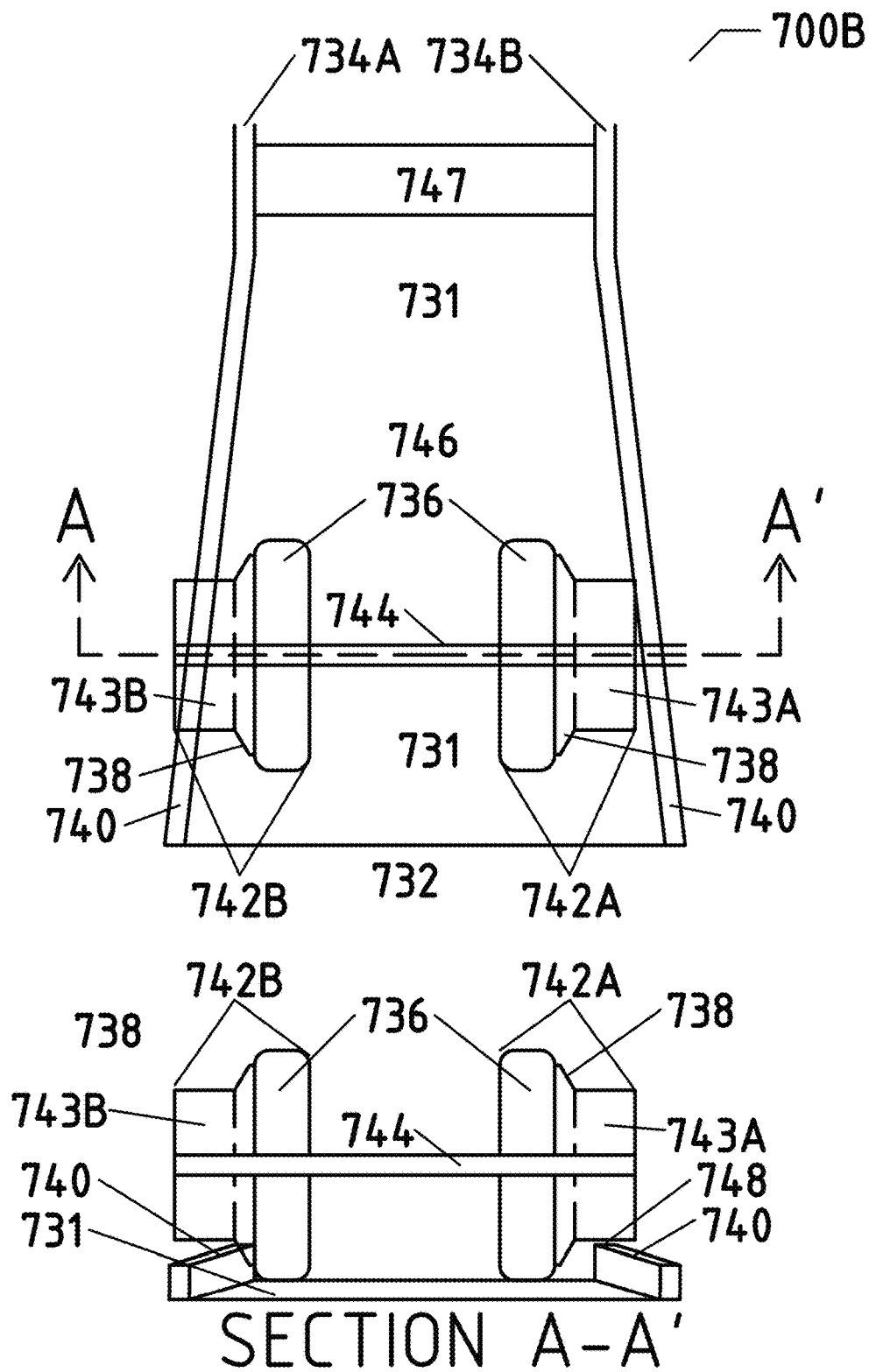
FIG. 7B are top and sectional view of a second mechanical transition span.

The transportation system can also share tracks with a conventional track rail system with active junctions using a 3-way switch, as illustrated in FIGS. 7A and 7B of U.S. Pat. No. 11,364,940. The 3-way switch has positions of turn left, turn right, or vehicle decides.

Subsequent figures will explain the operation of elements of the road-rail transportation system.

Passive junctions can contain four or six rail elements.

Figure 1B:
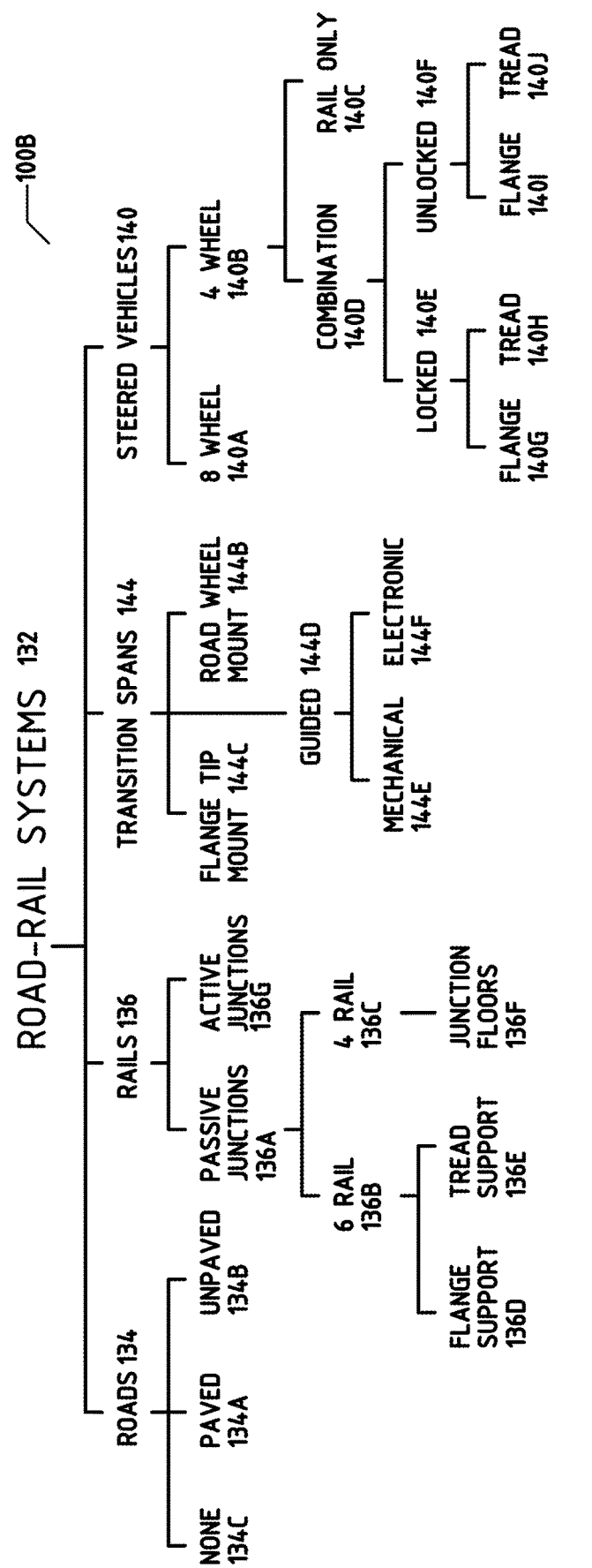
FIG. 1B is a tree diagram of a road-rail system options.

Description FIG. 1B

FIG. 1B is a tree diagram 100B of road-rail systems 132. There are options. A road-rail system consists of roads 134, rails 136, transition spans 144 that connect roads and rails, and steered vehicles 140.

Roads may be paved 134A or unpaved 134B, such as gravel, dirt, or grass. There is also an option for no roads 134C, or roads in the future.

Rail 136 are categorized by the design of their active junctions 136G or passive junctions 136A, which are also called passive turnouts. Passive junctions 136A can be comprised of six rails 136B as described in U.S. Pat. No. 11,364,940 or four rails 136C. A vehicle passing over a six rail junction can be supported by a road wheel tip (flange) support 136D or rail wheel wide tread support 136E in the junction. A wheel passing over a four rail junction 136C has its road wheel tip support supported by a junction floor 136F.

Transition spans 144 can be categorized by first contacting road wheels 144B or first contacting road wheel tips (flange) 144C. They can also be categorized by guidance method 144D. Vehicles may be mechanically guided 144E or electronically guided 144F using steering. A mechanical support for an H-vehicle on an electronic guided transition span can be as simple as a set of rails rising out of (or sinking into) a pavement.

Vehicles are ideally steered 140 by one of several possible methods. One application is eight wheel vehicles with four road wheels plus four rail wheels 140A, and vehicles with four wheels 140B. The four wheel vehicles can use rail-only wheels 140C or combination wheels 140D. The road wheel tip part (or section) of a combination wheel makes contact with roads and the tread part (or section) of a combination wheel makes contact with the rails. The sections can be locked together 140E or unlocked 140F. Both locked and unlocked wheels have both flange parts 140G and 140I and tread parts 140H and 140J for support. Both flange parts and tread parts can be conventional (narrow) or wide. Steered road and rail wheels are steered for different reasons. Road wheels are steered to keep a vehicle in its road lane and rail wheels are steered to provide lateral force at junctions, to guide a vehicle on a transition span, and to allow travel on tracks with a tight turn radii.

Figures will explain capabilities and options/limitations. For example, a Hi-Rail vehicle could be located on this diagram except its rail wheels cannot be steered, and transition spans are not currently used.

Figure 1C:
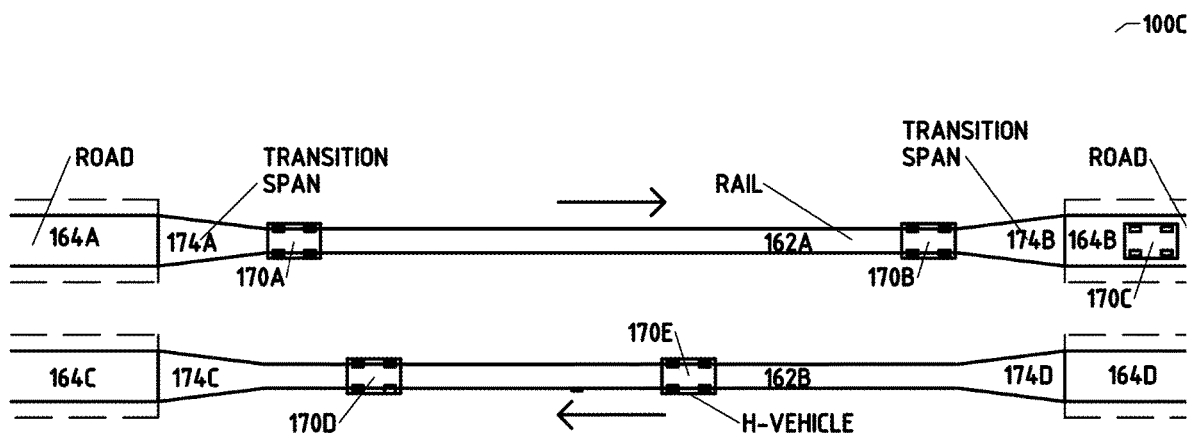
FIG. 1C is a top view of a pair of express road-rails.

Description FIG. 1C

FIG. 1C is a top view 100C of a pair of express road-rails. It can be used to offload road traffic. This system can be used to bypass highways in a city, increasing safety, reducing energy used, decreasing air pollution and reducing road damage. Bidirectional rails are 162A-B and bidirectional roads are 164A-D. Transition spans 174A-D connect rails and roads. H-vehicles 170A-E travel between roads and rails using transition spans.

This system can be particularly advantageous for use by semi-tractor trailers which damage roads. This system could also be implemented with one rail with turnouts (or sidings) to allow vehicles traveling in different directions or traveling at different speeds to pass on the single rail. For example the Patagonia region of Argentina has (abandoned) single rails and could be a good remote location for such an embodiment, bringing service to remote ranches and towns.

A network of these express road-rails can be built to make a transportation system with route switching done on roads, but a more efficient transportation system can be built with the addition of passive rail junctions.

Figure 1D:
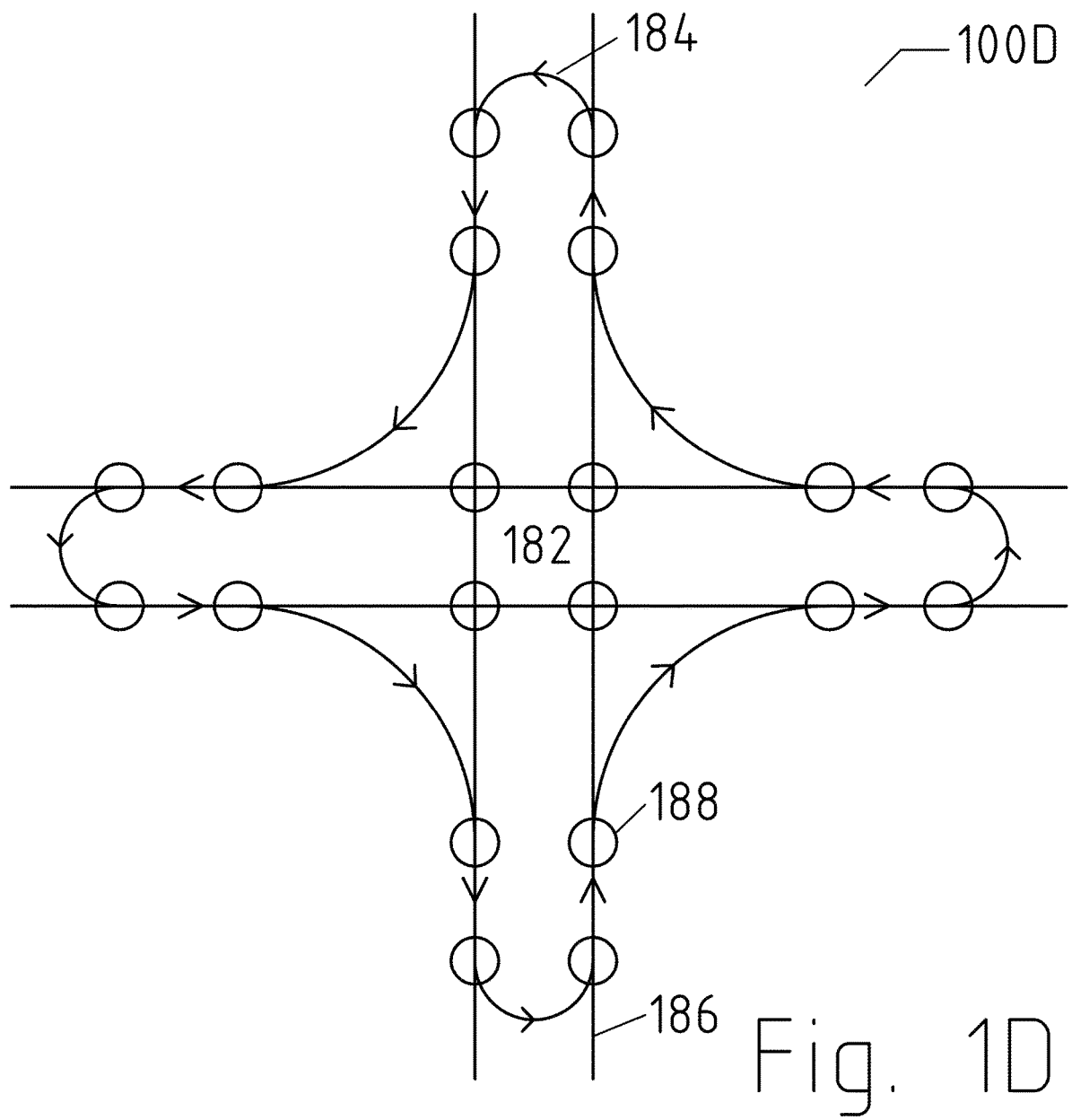
FIG. 1D is a top view of a passive rail bidirectional interchange.

Description FIG. 1D

FIG. 1D is a top view 100D of a passive rails bidirectional interchange 182. Vehicles coming into this interchange from any direction can exit to any direction. A pair of tracks 186 is identified as a single line in the figure. Travel direction is identified with arrows. Passive junctions e.g. 188 are identified with circles. Passive junctions are applications for vehicle steering as a source of lateral force. In the middle are four crossings, which are also applications for flange support surfaces. A tight turn radius enables a turn-around at point e.g. 184. This interchange can be built at grade saving construction cost. A TCS or traffic control system is anticipated.

Figure 2A:
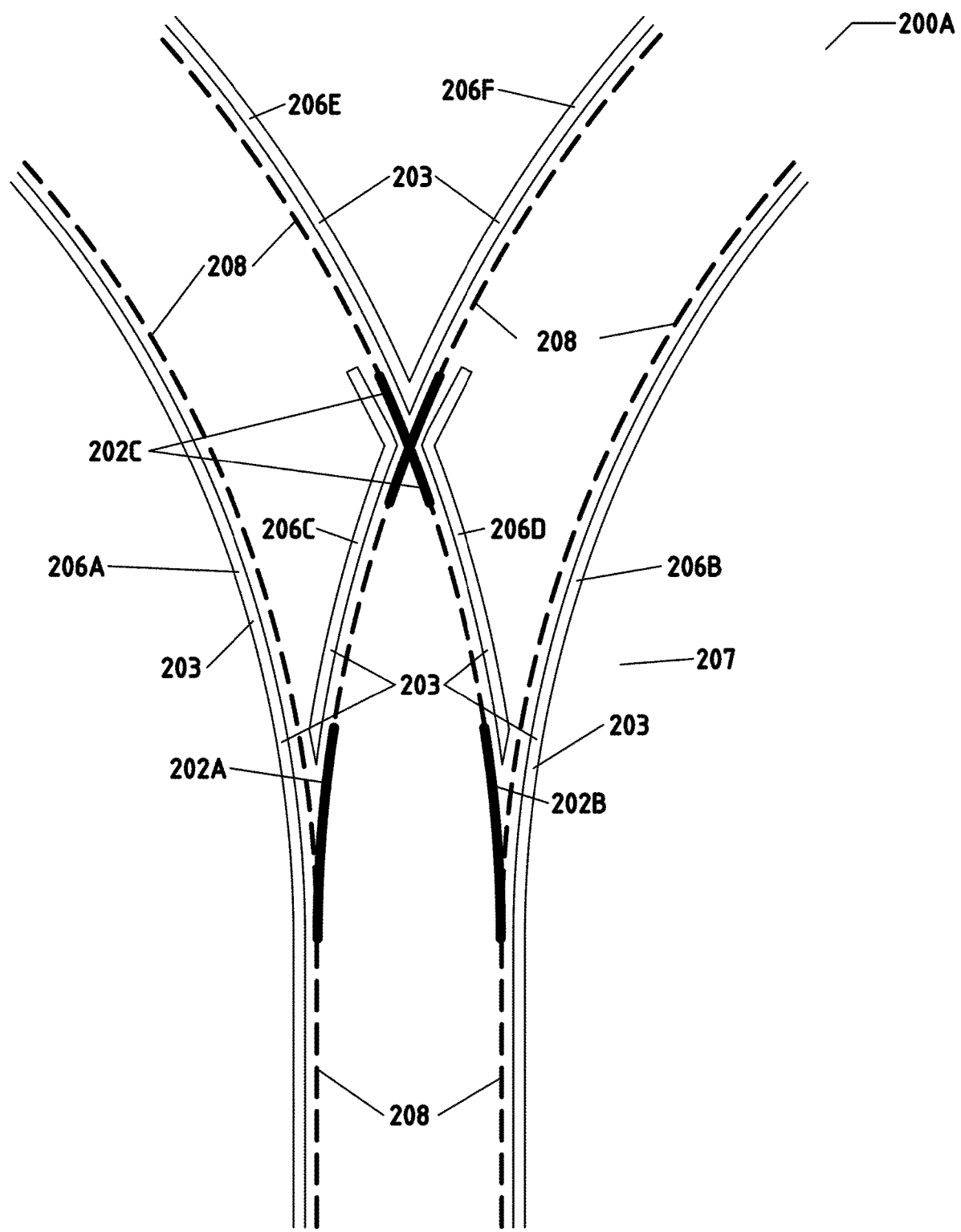
FIG. 2A is a top view of a passive six rail junction for use by either H-vehicles or R-vehicles.

Description FIG. 2A

FIG. 2A is a top view 200A of a passive six rail junction 207 for use by either H-vehicles or R-vehicles. Elements of this figure were extracted from U.S. Pat. No. 11,364,940. In this patent R-vehicle wheels are described that have wide treads and conventional flanges. As a rail wheel passes over a rail gap the wheel does not drop because it receives continuous support from a wide tread on the rail wheel.

Vehicles using this junction to turn may use four rail wheels if they are rail-only (R-) vehicles. If they are H-vehicles they may use four road wheels plus four different rail wheels. Alternately, if they are H-vehicles they may use four combination wheels. Combination wheels have a rail portion with a tread for rail support and a road portion with a road wheel tip for road support. The road wheel tip can also be used for vehicle support in junctions or transition span.

Illustrated are the tops of rails 203 and flange paths 208 which are shown as dashed lines. The flange paths 208 allows rail wheel or combination wheel flanges to cross (or pass through) other rails at passive junctions. Identified are an alpha rail 206A, a beta rail 206B, a gamma rail 206C, a delta rail 206D, an epsilon rail 206E and a zeta rail 206F. All rails remain static. Vehicles choose which path to take by applying lateral force when approaching the junction. Steering, diverters and other methods can be used to apply lateral force. The tops of the rails 203 are essentially at the same height.

Also illustrated as heavy lines are the three optional surfaces situated in the bottoms of the flange paths around the gaps. These are flange support surfaces 202A-202C which are elevated bottoms (or floors) in the flange path in a junction. The elevated floor can be used to support a road wheel tip of a conventional (narrow tread) rail wheel while passing over a gap in the rails, preventing rail wheel drop. A junction can be configured as a split, illustrated in FIG. 2A, a left turnout, a right turnout, or other configurations. R-vehicles, as described in U.S. Pat. No. 11,364,940 do not require flange support surfaces because they use rail wheels with wide treads.

Figure 2B:
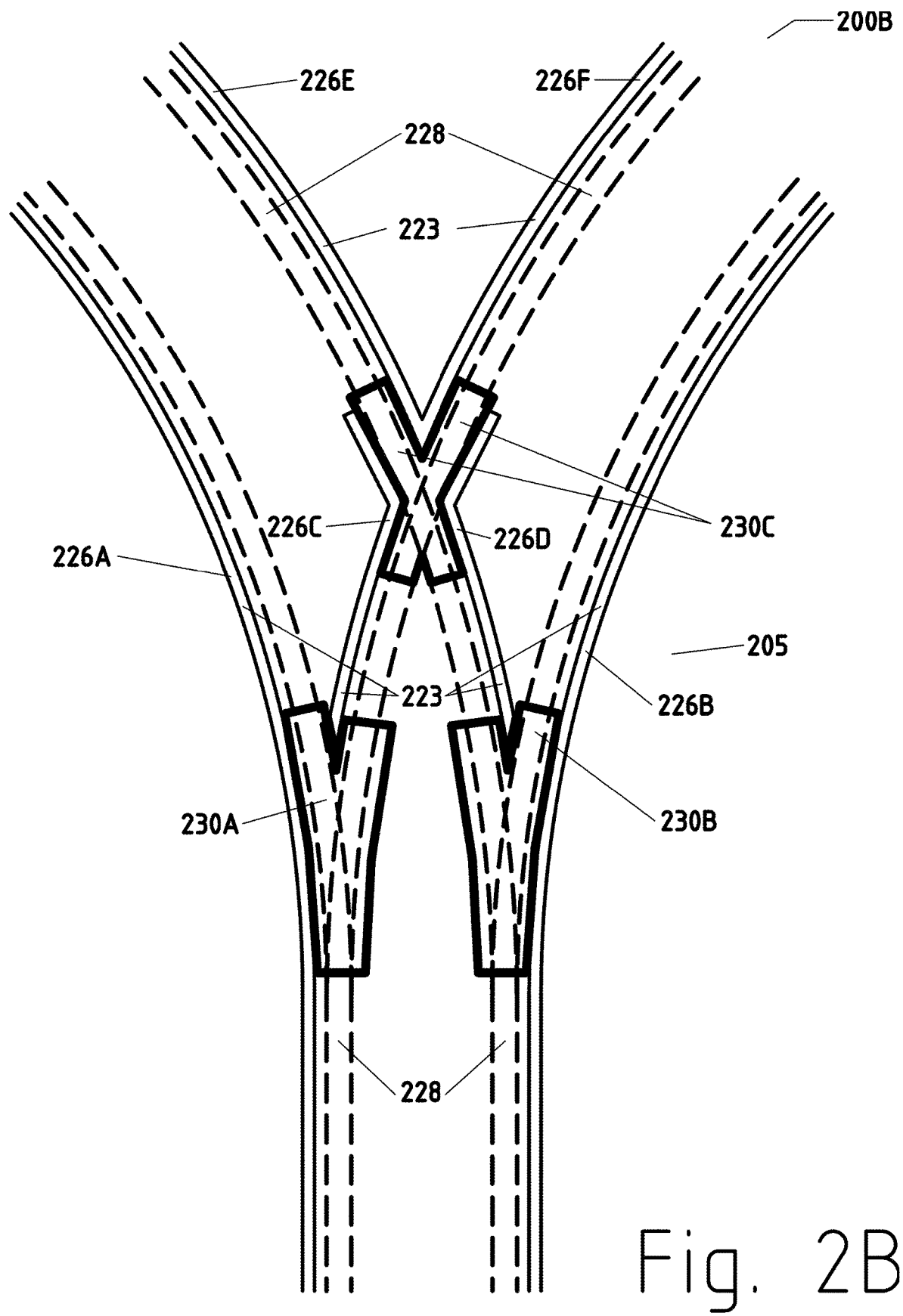
FIG. 2B is a top view of a passive six rail junction that is FIG. 2A modified.

Description FIG. 2B

FIG. 2B is a top view 200B of a passive six rail junction 205 that is FIG. 2A modified. Rail junction 207 of FIG. 2A has been modified to allow the passage of combination wheels with wide flanges. The wide flanges have load bearing tires on road wheel tips that may be made of an elastic material, such as rubber. Rails identified are an alpha rail 226A, a beta rail 226B, a gamma rail 226C, a delta rail 226D, a gamma rail 226E and a zeta rail 226F. Rail tops 223 are all essentially at a same height. Wide flange paths 228, illustrated as areas between dashed lines, contains wide flange support surfaces 230A-C located a uniform distance below the rail tops and above rail ties (or sleepers).

Ultimately as the tire portion of the combination wheel gets wider and wider the wide flange paths 228 get increasingly wide until the gamma and delta rails shrink and disappear. At some point using a wide flange on a combination wheel to prevent rail gap drop becomes impractical because it is too long, but the flange support surfaces 230A-C prevent combination wheels from dropping into rail gaps by supporting road wheel tips. Upper and lower flange support surfaces 230A-C illustrated as areas between thick solid lines support the wide road wheel tips on the combination wheels when rail support is lost for a combination wheel tread. The upper and lower flange support surfaces may optionally be connected.

Figure 2C:
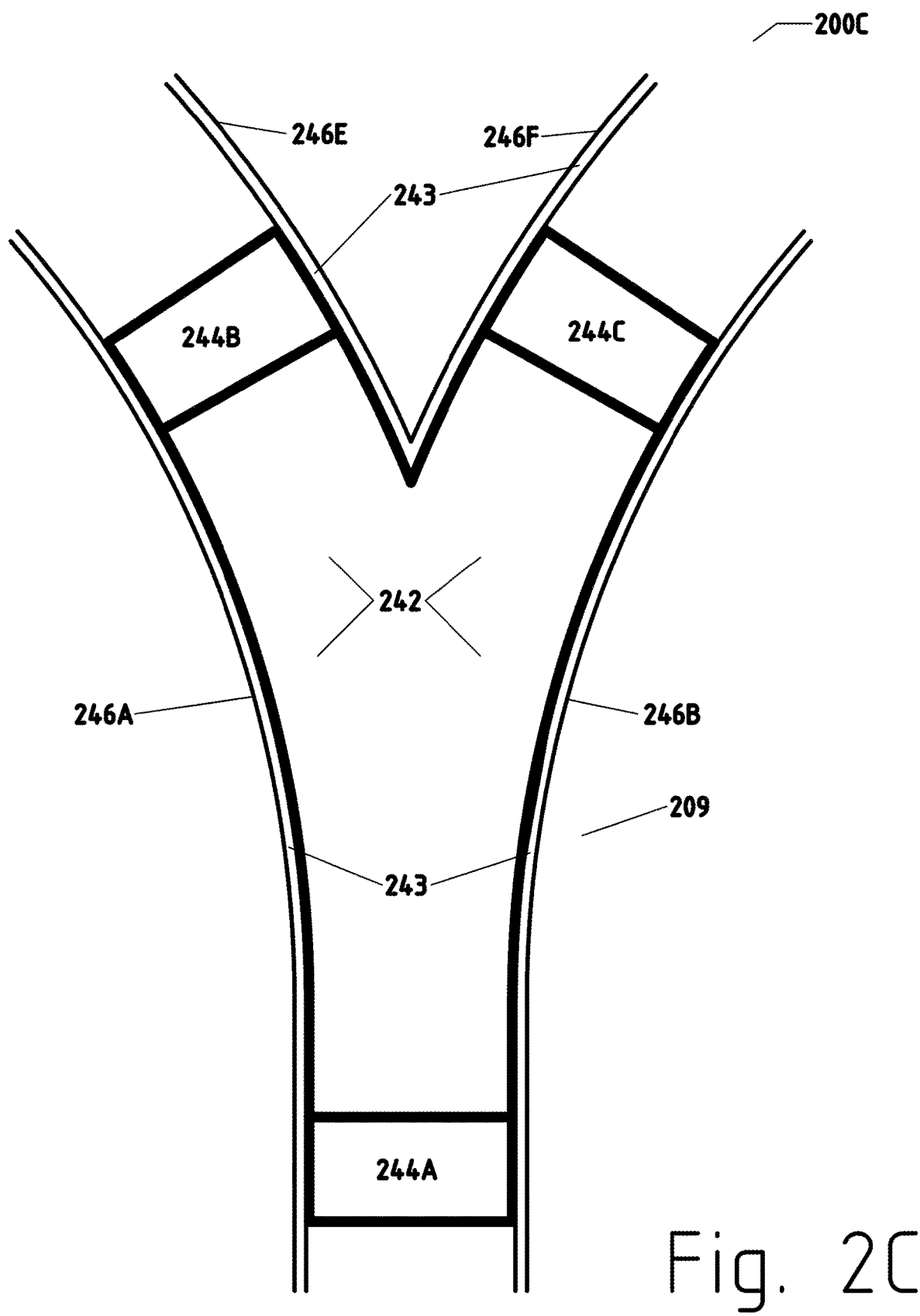
FIG. 2C is a top view of a passive rail junction used by H-vehicles with four combination wheels.

Description FIG. 2C

FIG. 2C is a top view 200C of a passive rail junction 209 used by H-vehicles with four combination wheels. Rails identified are an alpha rail 246A, a beta rail 246B, an epsilon rail 246E and a zeta rail 246F. Rail tops 243 are all essentially at a same height. Gamma and delta rails are not used. This illustrates what happens when a wide flange path expands and overtakes the gamma and delta rails. This drawing brings up a question of how a vehicle passing through this junction to the right or left receives support for wheels not contacting a rail. Support is provided by the road wheel tips on the combination wheels contacting a junction floor 242. The junction floor is located a uniform distance below the rail tops.

The combination wheel road wheel tips may be narrow and made of steel, so are only suitable for running on hard surfaces. Alternately, the road wheel tips may be wide and made of rubber and so are also suitable for also running on paved roads without damage to the road's pavement. The junction floor 242 can be made of steel for durability or pavement material such as reinforced concrete to provide better traction.

Illustrated also is an up ramp 244A leading up to the junction floor. Its job is to engage a combination wheel's road wheel tip to lift tread parts of the H-vehicle's wheels slightly above a rail while going into a junction. Junction down ramps 244B and 244C place the H-vehicle's wheel tread back onto the tracks and leave the road wheels suspended in the air.

Figure 3A:
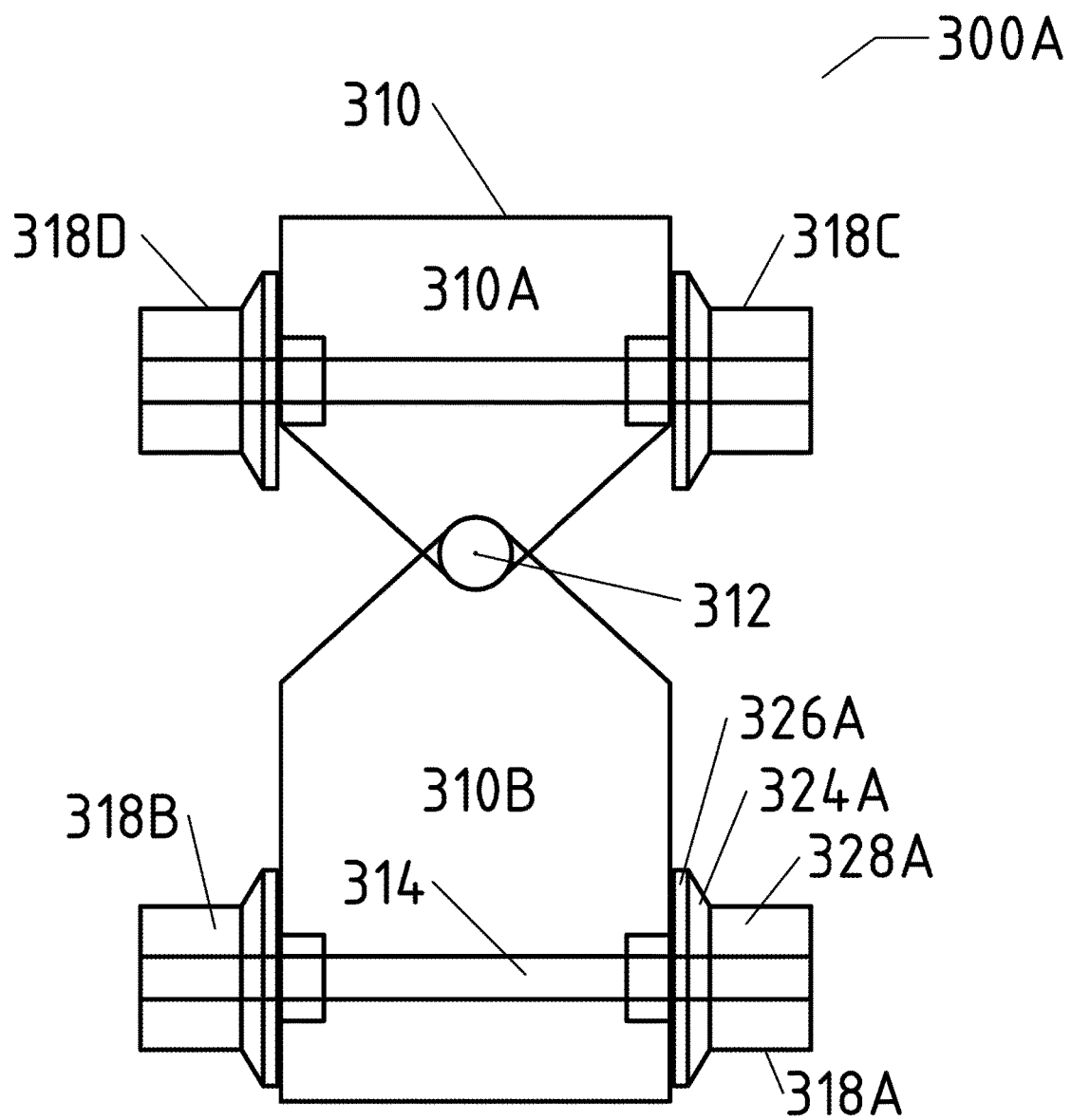
FIG. 3A is a top view of R- or H-vehicle with four wheels and steering.

Description FIG. 3A

FIG. 3A is a top view 300A of an R- or H-vehicle 310 with 4 wheels and steering. This vehicle can be used on rails exclusively or roads and rails, but its narrow flange tip 326A can damage roads and can provide poor traction on roads. It has a chassis front 310A and back 310B, a pivot point 312, 2 rail wheels in the front 318C-D and 2 rail wheels in the back 318A-B. This vehicle can be used over junctions as illustrated in FIG. 2A-C. The rail wheels 318A-D have flanges 324A with narrow flange tips 326A and wide treads 328A. The vehicle uses articulated steering by rotating the chassis sections around a pivot point 312. Steering may used for both road and rail travel. In normal straight rail travel or gradual turns the steering may be fixed, but steering may be employed to facilitate a very tight turn as mentioned previously. For example, if a narrow gauge track is located in mountains or hilly terrain, track turning radius may need to be small.

The narrow flange tips 326A can potentially cause damage to a surface that it comes into contact with, so contacted support surfaces must be durable, such as steel.

The rail wheels of the FIG. 3A chassis can be exchanged for road wheels for road-only travel, or for combination wheels that can be used for both road and rail travel, as will be discussed in FIG. 3C.

Figure 3B:
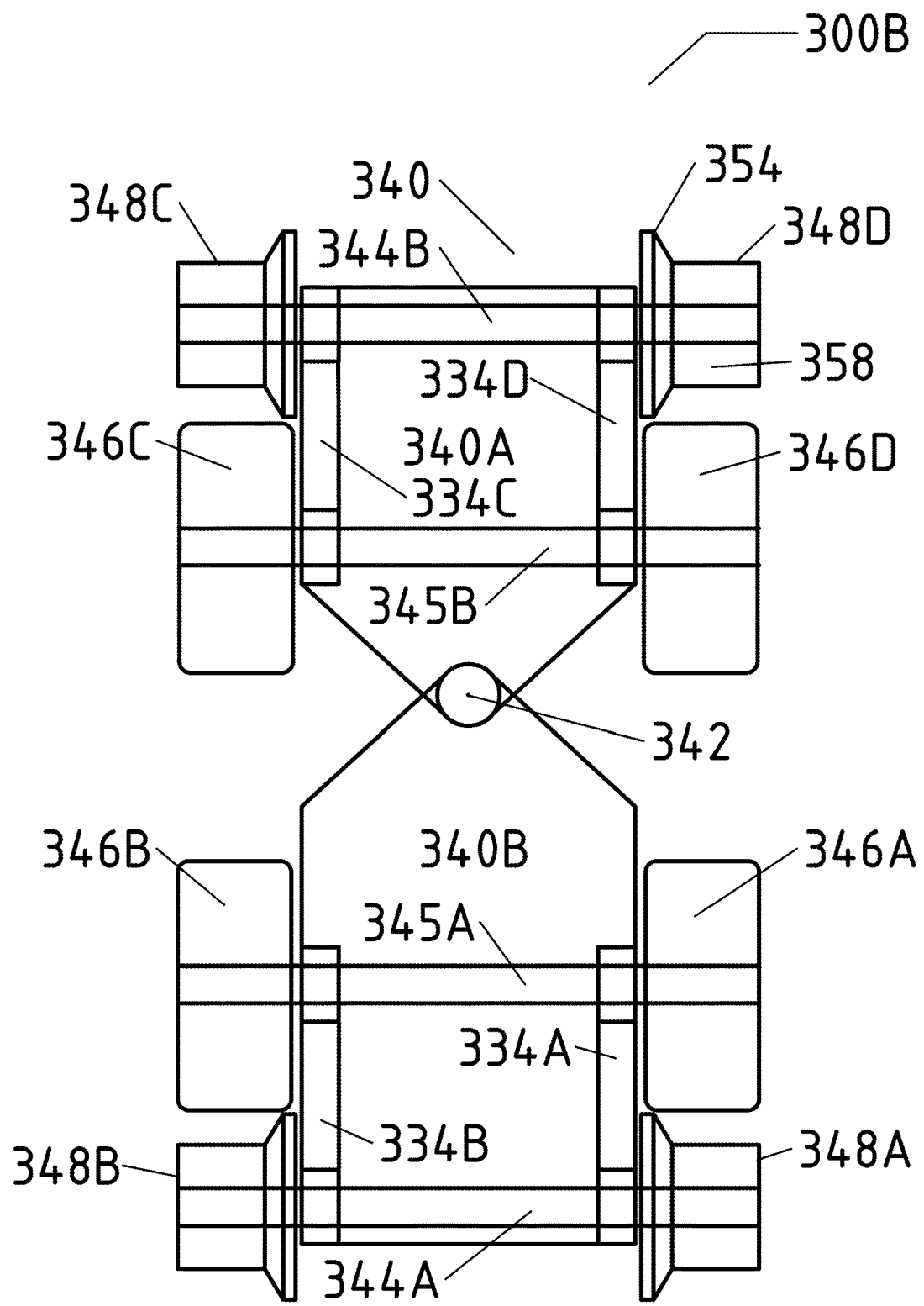
FIG. 3B is a top view of a steerable H-vehicle with four rail wheels and four road wheels.

Description FIG. 3B

FIG. 3B is a top view 300B of a steerable H-vehicle 340 with four rail wheels 348A-D and four road wheels 346A-D. FIG. 3B contains a chassis front 340A and chassis back 340B, a pivot point 342. The four road wheels 346A-D are disposed in the middle of the vehicle and the four rail wheels 348A-D are located in the front and back of the H-vehicle. Rail wheels have flanges e.g. 354 and optionally wide treads e.g. 358. For road travel, the road wheels support the H-vehicle's weight. For rail travel, rail wheels support the H-vehicle's weight and keep the vehicle aligned over the tracks, although road wheels may also contact the rail tops for improved traction or braking.

A front rail axle 344B stays approximately parallel to a front road axle 345B in a turn, and a rear rail axle 344A remains approximately parallel to a rear road axle 345A in a turn. The vehicle uses articulated steering by rotating the chassis sections 340A and 340B around the pivot point 342. Articulated steering is used for road travel and also to make a left or right turn on rails. The same steering mechanism can also be used for rail travel to make turns by generating lateral force, or to navigate a tight radius curved track. In normal straight rail travel or gradual turns the steering may be fixed or locked, but steering may be employed to facilitate very tight turns. In a tight turn, flange to rail edge interference causes friction and wear and should be avoided.

Swing arms 334A-D are used to raise and lower rail wheels. Swing arms are connected between the chassis halves 340A and 340B and rail wheel axles 344A and 344B, and may be raised and lowered using manual means or actuators. Alternately swing arms can pivot around road wheel axles 345A and 345B instead of the chassis halves as illustrated.

Figure 3C:
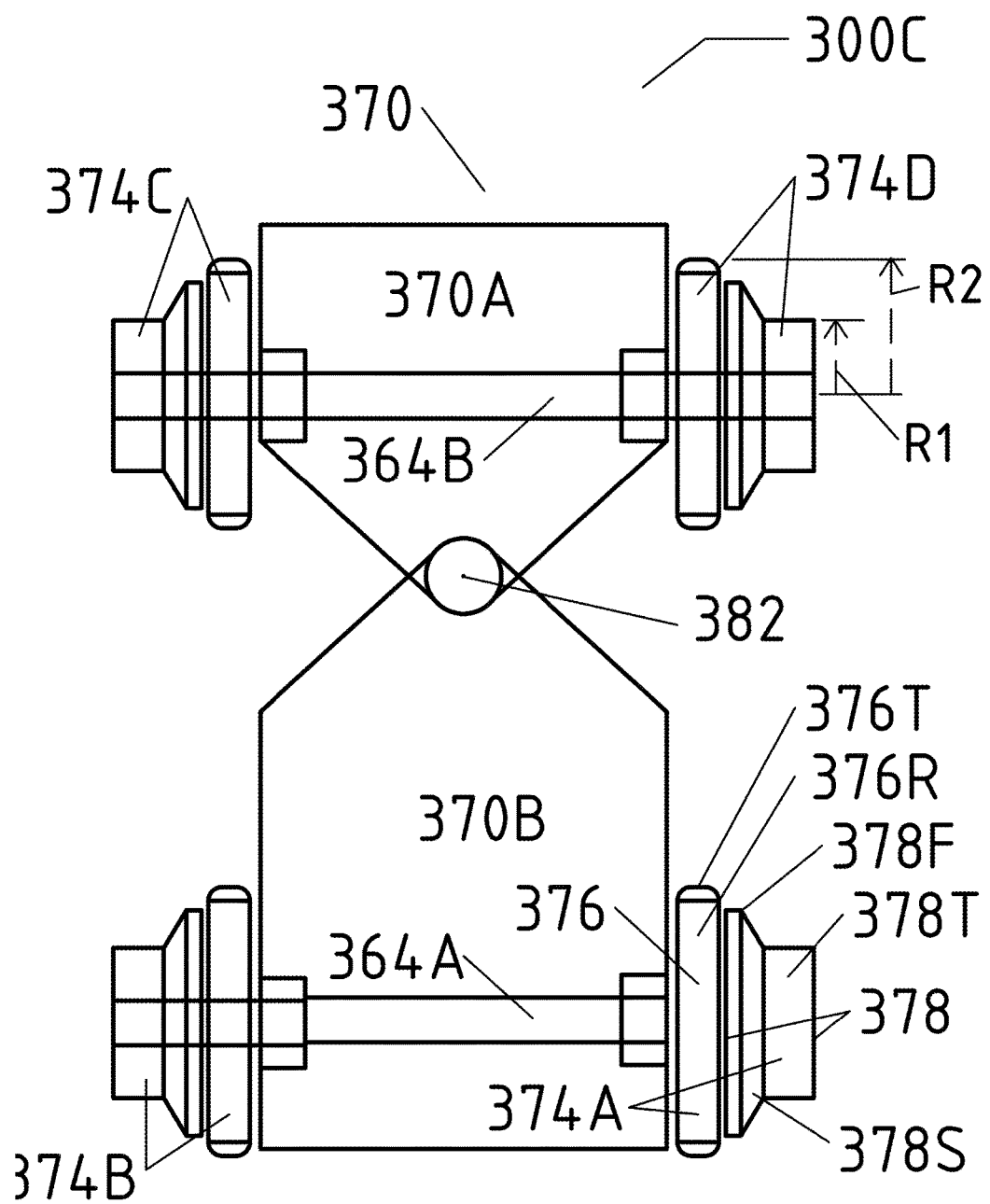
FIG. 3C is a top view of a steerable H-vehicle with four combination wheels.

Description FIG. 3C

FIG. 3C is a top view 300C of a steerable H-vehicle 370 with four combination wheels 374A-D. The vehicle's chassis has a front part 370A and a back part 370B. The combination wheels 374 have a road wheel part 376 and a rail wheel part 378. The two wheel parts may be concentric and may both rotate around a common axle 364A-B. The road wheel part consists of a rim 376R and a tire 376T, which may be an elastic material such as rubber. The tire 376T may also be described as part of a road wheel tip. The rail wheel part has a tread surface 378T and a flange 378F with a flange side 378S. The flange 378F has the angled side surface 378S for contacting a rail (not illustrated). Note that a radius of a road wheel's tip is a larger R2, but the radius of a rail wheel's tread is a smaller R1. If the parts rotate together the combination wheel may be said to be locked. When transitioning from road travel to rail travel a locked combination wheel must change angular velocities quickly, possibly causing slippage. This can be remedied by unlocking them and allowing them to rotate at different angular velocities as will be illustrated in a later figure.

On a combination wheel, a road wheel tire 376T is part of a road wheel tip suitable for traction on roads.

Because the road wheel part of a combination descends below the track top surfaces while mounted on a track, this machine is not suitable for trolley service (a.k.a. street cars in the USA) where the rack surface is level with the road surface. For trolley service the embodiments of 3A, 3B and 3D should be considered. Rails crossing roads are also a design consideration for combination wheels.

Figure 3D:
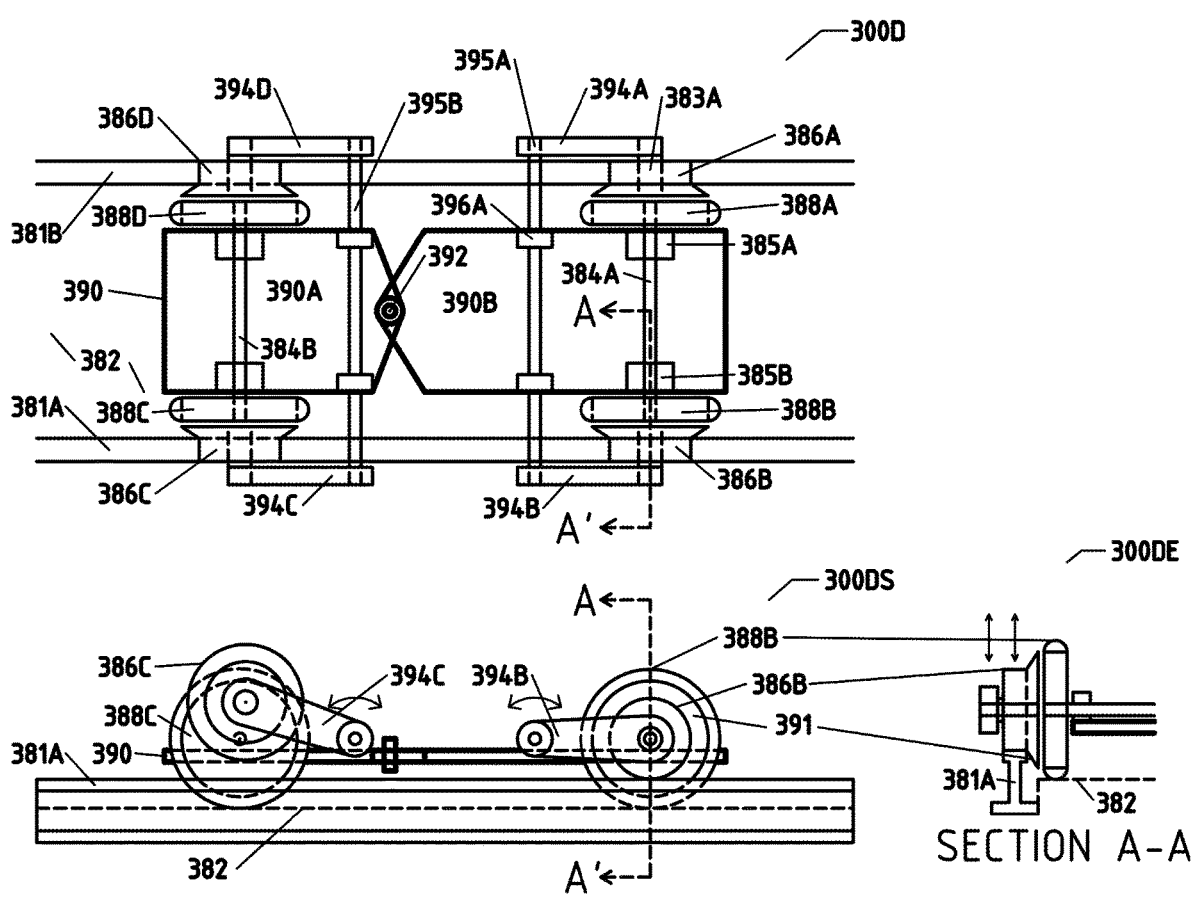
FIG. 3D are top, side, and sectional views of an H-vehicle with four road wheels.

Description FIG. 3D

FIG. 3D are top 300D, side 300DS and sectional 300DE views of an H-vehicle 390 with four road wheels e.g. 388A-D. The road wheels are situated adjacent to four rail wheels e.g. 386A-D. The four rail wheels 386A-D are contacting rails 381A and 381B. The chassis front 390A and chassis back 390B rotate around a pivot 392 to steer. Road wheels 388A-D rotate around road wheel axles 384A-B which are connected to the chassis with bearings e.g. 385A-B. Rail wheels rotate around rail wheel axles e.g. 383A. Rail wheel axles are inserted into swing arms 394A-D which connect to lift shafts 395A-B. The lift shafts are connected to the chassis with bushings e.g. 396A.

However road wheel 388A-D and rail wheels 386A-D are not locked. So one wheel set (e.g. rail wheels) can be moved up and down relative to the other wheel set (road wheels) by rotation of swing arms 394A-D. This allows road or rail wheels to contact support surfaces at different vertical levels.

For the sake of illustration, in the side view 380DS the front swing arm 394C axle has been rotated to lift front rail wheels 386C-D off of the rail, so the front of the H-vehicle is being supported by 2 front road wheels 388C-D contacting a rail floor 382.

Rotational speed may be programmed to avoid wheel skidding or slipping when rapidly transitioning from road to rail or rail to rail junction. Methods for driving wheels is not illustrated, but motors can be placed inside wheels, or they may be driven by chains, belts, or pulleys. Likewise actuators that rotate the swing arms or steer are not illustrated.

Front and rear swing arms can be rotated separately.

Sectional view 380DE illustrates an end view of half of a vehicle, a rail 381A and a rail floor 382. Also illustrated are flange side 391 in contact with an edge of the rail 381A, road wheel 388B, and rail wheel 386B.

Optionally, the rail wheels can be raised for road travel or lowered fully for rail travel or for a road crossing. Also rail wheels can be lowered for trolley service. At the end of the rail, the rail wheels can be lifted allow the trolley to operate like a bus using road wheels A-D.

When traveling on the rail, the rail axle can be raised slightly to force the road wheel 388A-D to contact the rail floor 382. This can be done to improve traction to help climb steep hills or provide better breaking than what would be possible with steel rail wheels contacting steel rails. Rail floors may be placed between rails only where a traction need is anticipated. A rail floor should not interfere with water drainage from the tracks.

Traction and breaking can be applied to road wheels, rail wheels, or both.

Alternately, road wheel part can be situated outside of rail wheel parts. This would require the road wheels to be in an elevated or up position while passing through a junction to avoid road wheels hitting a rail. However this embodiment could still use a transition span to mount a rail, but it would require another diverter means beside steering to generate lateral force on a rail. An H-vehicle could choose its own outlet rail if using the rail junction illustrated in FIG. 2A.

Figure 4A:
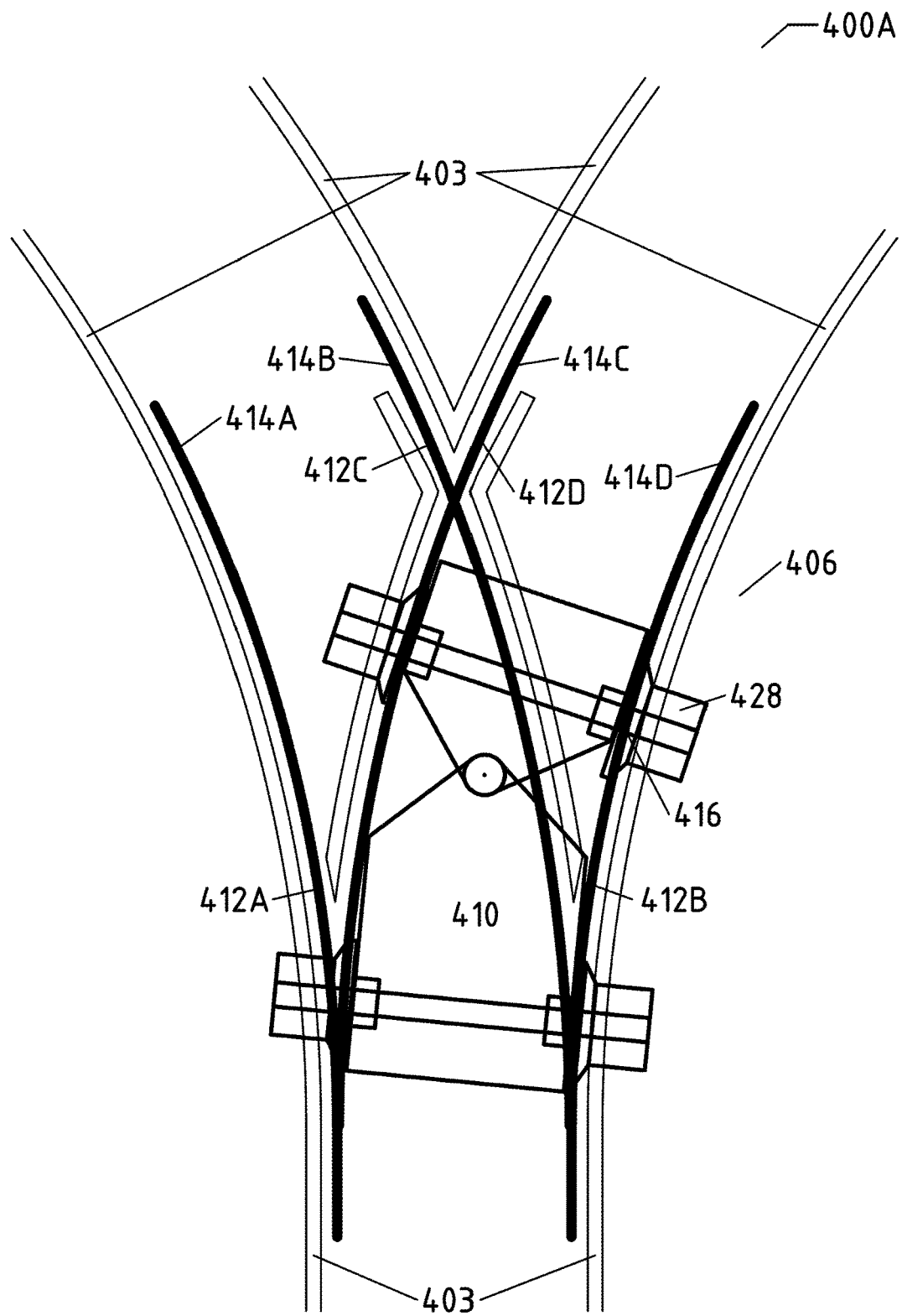
FIG. 4A is a top view of a passive six rail junction with optional flange support surfaces and a vehicle.

Description FIG. 4A

FIG. 4A is a top view 400A of a passive six rail junction 406 with optional flange support surfaces 414A-D and a vehicle 410. The four wheel R-vehicle 410 is making a right turn by applying lateral force. This is similar to the vehicle of FIG. 2A mounted on the track of FIG. 3A. Side (or lateral force) is generated by steering while going into a turn. Traction is applied to rail wheels, and steering is accomplished by changing an angle between the front axle and the rear axle. The flanges on the rail wheels pass through rails via flange paths.

The tread e.g. 428 of a rail wheel can be wide, as illustrated, or narrow. A wide tread will prevent a rail wheel from dropping into a rail gap 412A-D. If the tread is narrow the rail wheel can drop into the rail gaps. The flange support surfaces 414A-D can prevent rail wheels with narrow tread from dropping while passing over rail gaps. The flange support surface contacts rail tips 416 for support. The top of a flange support surface is situated below the rail tops. These support surfaces are currently used in frog portions of active rail switches.

Figure 4B:
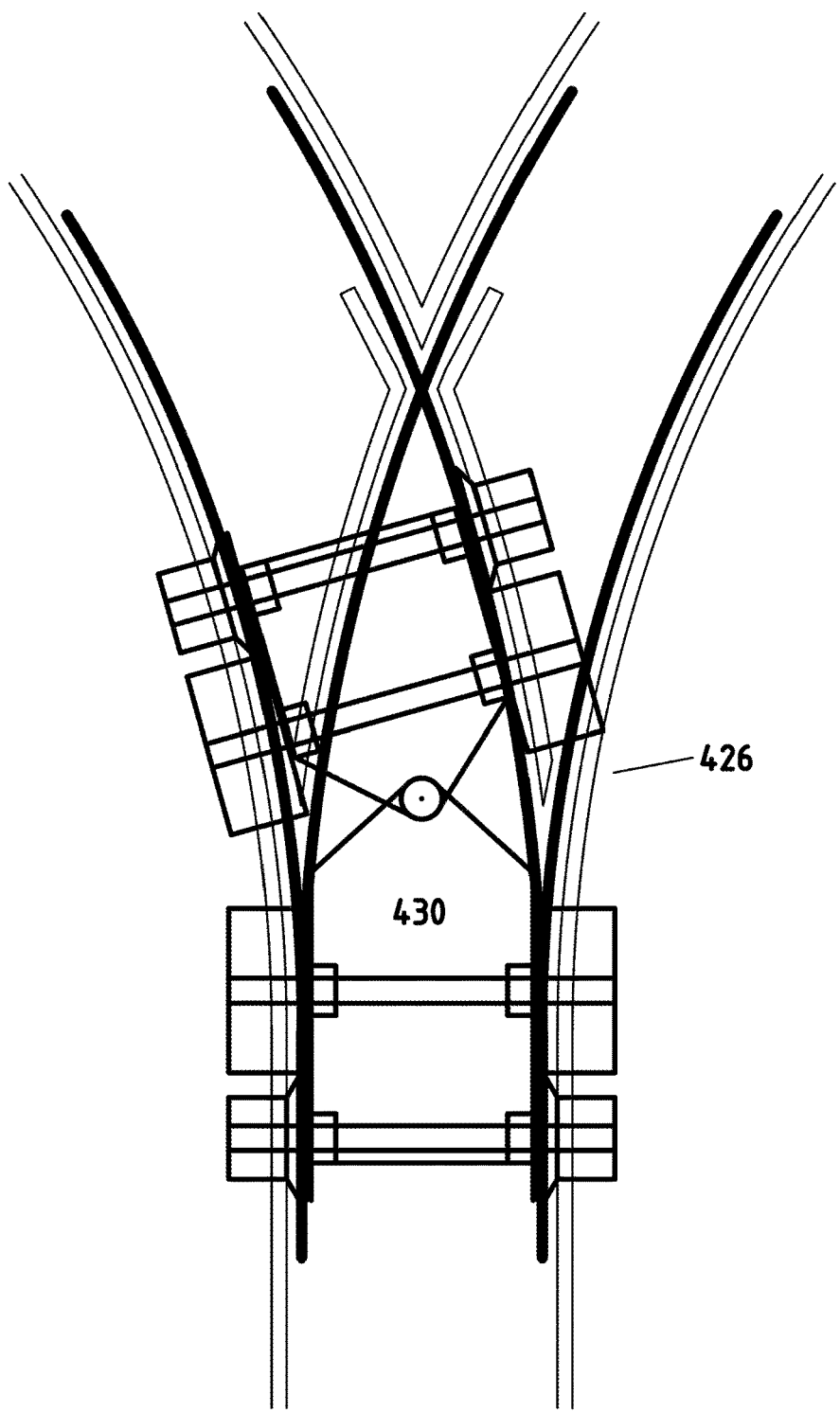
FIG. 4B is a top view of a passive six rail junction with an eight wheel H-vehicle making a left turn by applying lateral force.

Description FIG. 4B

FIG. 4B is a top view 400B of a passive six rail junction 426 with an eight wheel H-vehicle 430 making a left turn by applying lateral force. This illustrates the vehicle of FIG. 3B illustrated on the track of FIG. 2A. This junction 426 can be the same as illustrated in FIG. 4A. Rail wheels in the front and back are lowered to keep the vehicle on the track. The side or lateral force is generated by steering while going into a turn. Traction can be supplied by all or just some of the rail wheels in contact with the rail. Alternately, road wheels can contact the tops of the rails and also provide traction or improve breaking. Generally, any road wheels not supplying traction are elevated to reduce rolling resistance. On the road, this hybrid rail vehicle rides on road wheels with its rail wheels elevated. The flange support surfaces may optionally support narrow flange rail wheels to prevent rail wheel drop while going over a rail gap.

Figure 4C:
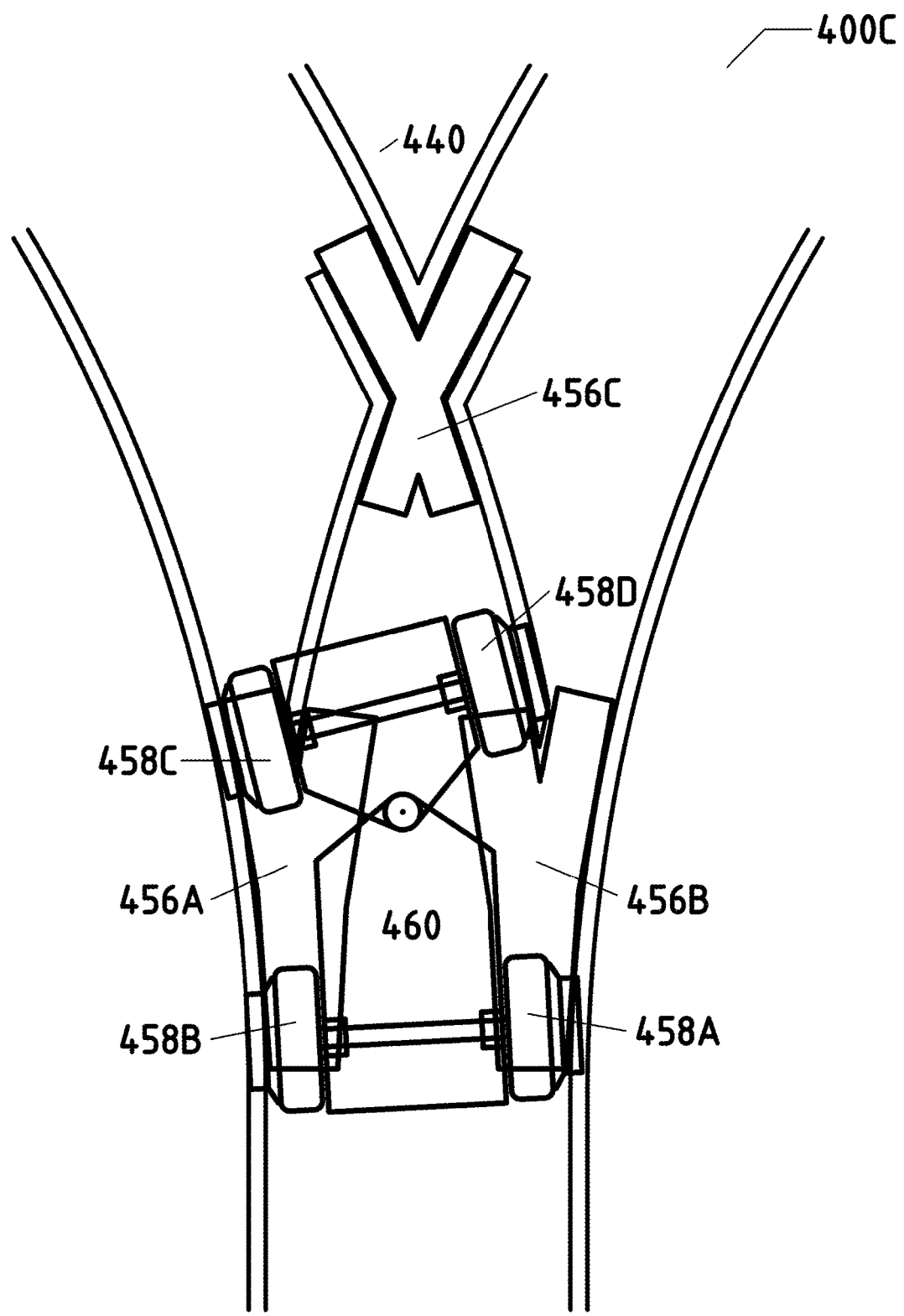
FIG. 4C is a top view of a passive six rail junction with four wide road wheel tip combination wheels passing through wide flange paths.

Description FIG. 4C

FIG. 4C is a top view 400C of a passive six rail junction 440 with four wide road wheel tip combination wheels 458A-D passing through wide flange paths. This track is similar to the track illustrated in FIG. 2B, except flange path dashed lines have been removed for illustration. An H-vehicle 460 is similar to the vehicle in FIG. 3C. The H-vehicle 460 has four combination wheels 458A-D with narrow tread and wide tires (road wheel tips). Its tires are supported by flange support surfaces 456A-C in the junction. The upper and lower flange support surfaces may optionally be connected. Flange support surfaces go down (sink or descend) outside of the junction.

Figure 4D:
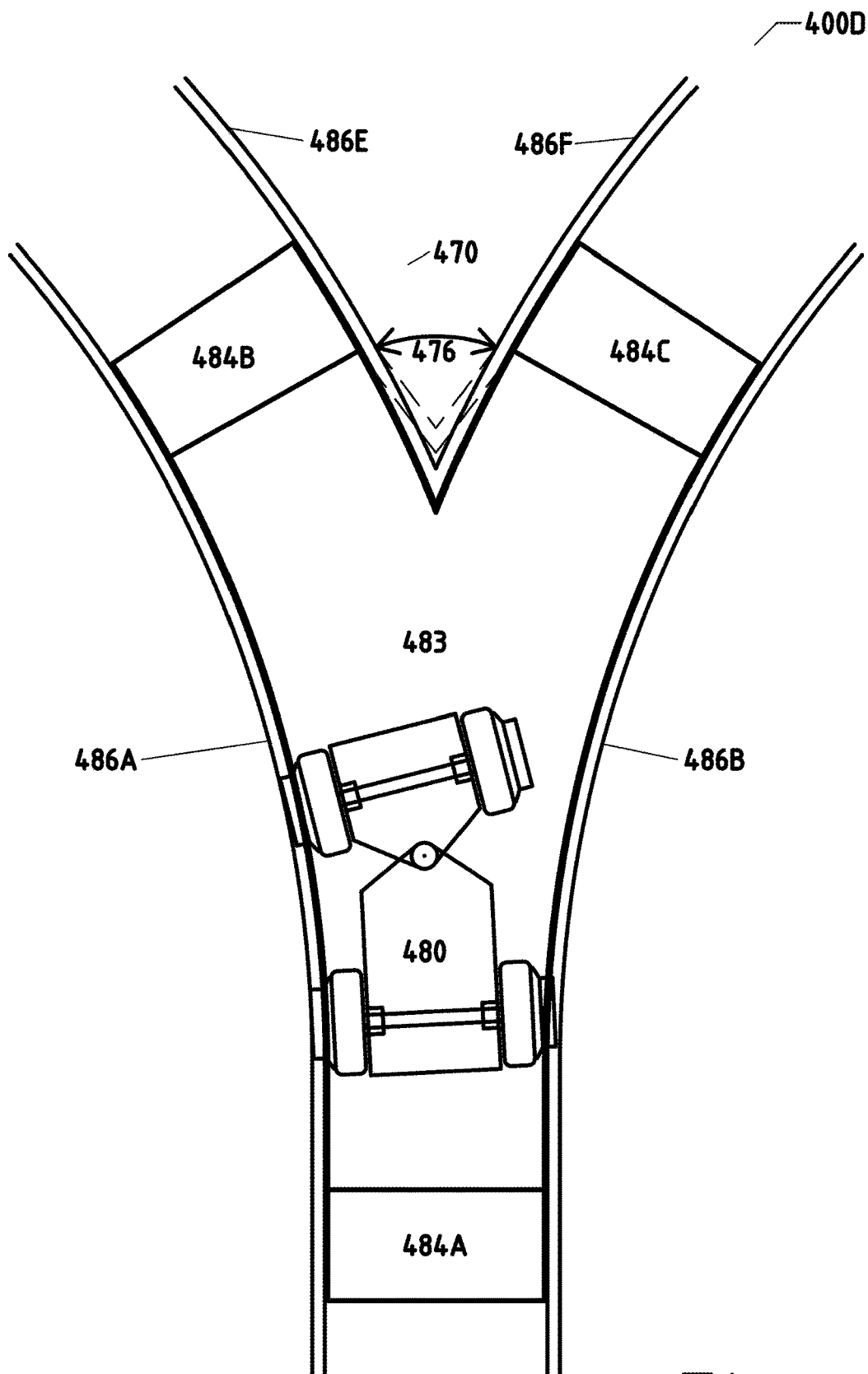
FIG. 4D is a top view of a passive four rail junction with a four combination wheel H-vehicle making a left turn.

Description FIG. 4D

FIG. 4D is a top view 400D of a passive four rail junction 470 with a four combination wheel H-vehicle making a left turn. Rails are an alpha rail 486A, a beta rail 486B, an epsilon rail 486E and a zeta rail 486F. The junction 470 is similar to the junction illustrated in FIG. 2C. Junction 470 has a junction floor acting as a flange support surface 483 but does not have gamma and delta rails. The tire (road wheel tip) of the four combination wheels are in contact with the junction floor 483 below, and the left flange sides are in contact with the alpha rail 486A. The junction floor 483 is situated below the rail top surfaces by a distance that is slightly less than the flange height. Contact with the alpha rail is maintained by H-vehicle steering to the left. Up and down ramps 484A-C are illustrated.

It is important to keep the H-vehicle's wheel flanges in contact with the alpha rail during a right turn to avoid one front wheel going left while the other tries to go right at a rail point. Where the epsilon and zeta rails meet, a point angle 476 can be made larger to accommodate imprecise H-vehicle alignment or positioning. This is shown with dotted lines. H-vehicle misalignment could be caused, for instance by ice, high wind, sensor malfunction, or bad driving.

Figure 5A:
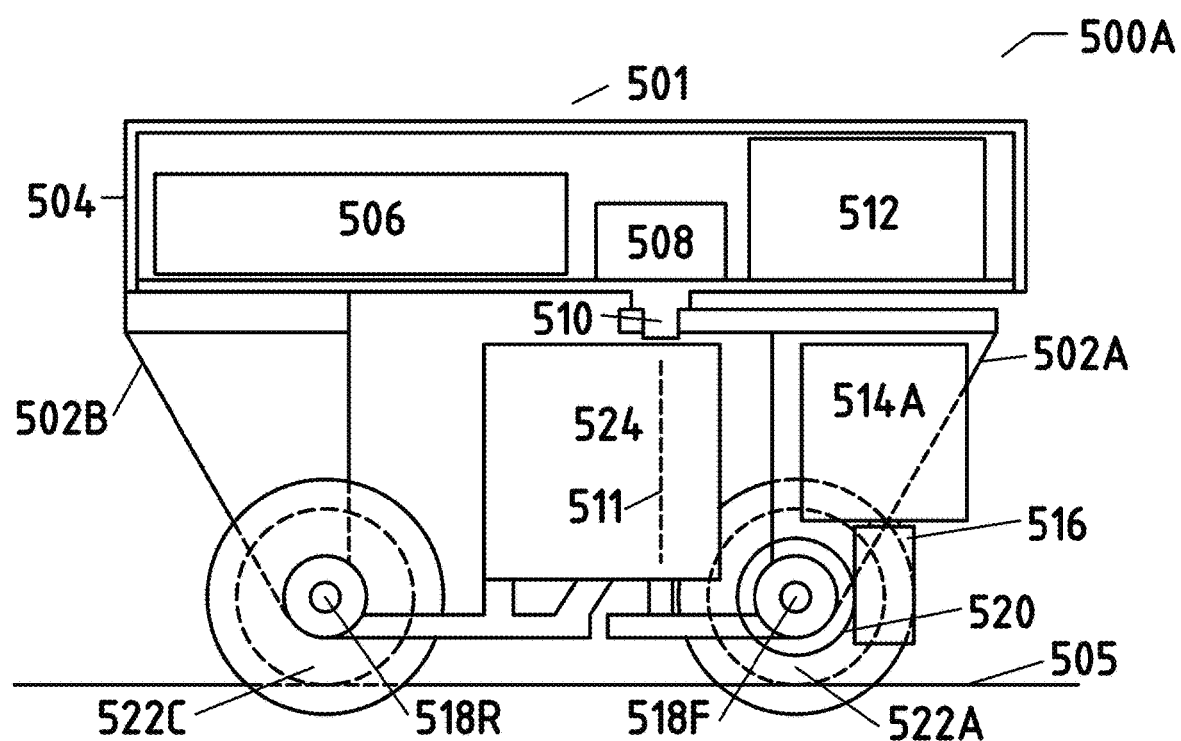
FIG. 5A is a sectional side view of a four wheel R-vehicle with rail wheels intended for rail-only use.

Description FIG. 5A FIG. 5A is a sectional side view 500A of a four wheel R-vehicle 501 with rail wheels intended for rail-only use. This vehicle may ideally be used with the junction illustrated in FIG. 2A, but it can also be used with all others. The drawing is for a model scale application and can be used for demonstration, but mechanics also apply to any scale, including full-scale. The model was sized for G-scale tracks. The section cut was made down the center of the vehicle front to back.

The vehicle 501 is riding on a rail top surface is 505. The vehicle consists of a front chassis 502A, a rear chassis 502B, and a top 504. The top 504 contains a battery 506, a radio control receiver 508, a top pivot pin 510 located on a pivot line 511 and a motor controller 512. Mounted to the front chassis 502A is a brushless motor 514 with a worm gear 516, and a front axle 518F. The front axle mounts a gear 520, and two rail wheels 522A-B (522B not illustrated).

Mounted to the rear chassis 502B are the top 504, a steering servo motor 524, a rear axle 518R.

If this vehicle is taken off of a rail, it can run on a flat road surface on the rail wheel, supporting itself on the wheel's narrow road wheel tips. However traction tends to be poor and its narrow road wheel tips can damage a pavement.

This R-vehicle that has articulated steering with chassis sections 502A and 502B rotating around the pivot 510. The servo motor 524 provides steering with rotation around the pivot line 511 which is aligned vertically. The vehicle can operate on rails with passive junctions by applying lateral force which is generated by steering. The rail wheels have a flange portion with an optionally wide tread. A small radio control receiver is illustrated for radio and servo control, alternately an ESP32 computer can be used and the vehicle can be controlled with Wi-Fi or Bluetooth. One channel is used for steering, one is used for speed control.

There are two options for rail wheel tread width. If tread width is wide, as discussed in U.S. Pat. No. 11,364,940, the junction illustrated in FIG. 2A can be used without raised flange support surfaces. If the rail wheels do not have wide tread surfaces, the flange support surfaces illustrated in FIG. 2A can prevent rail wheels from dropping into flange gaps by supporting the wheel tips.

Figure 5B:
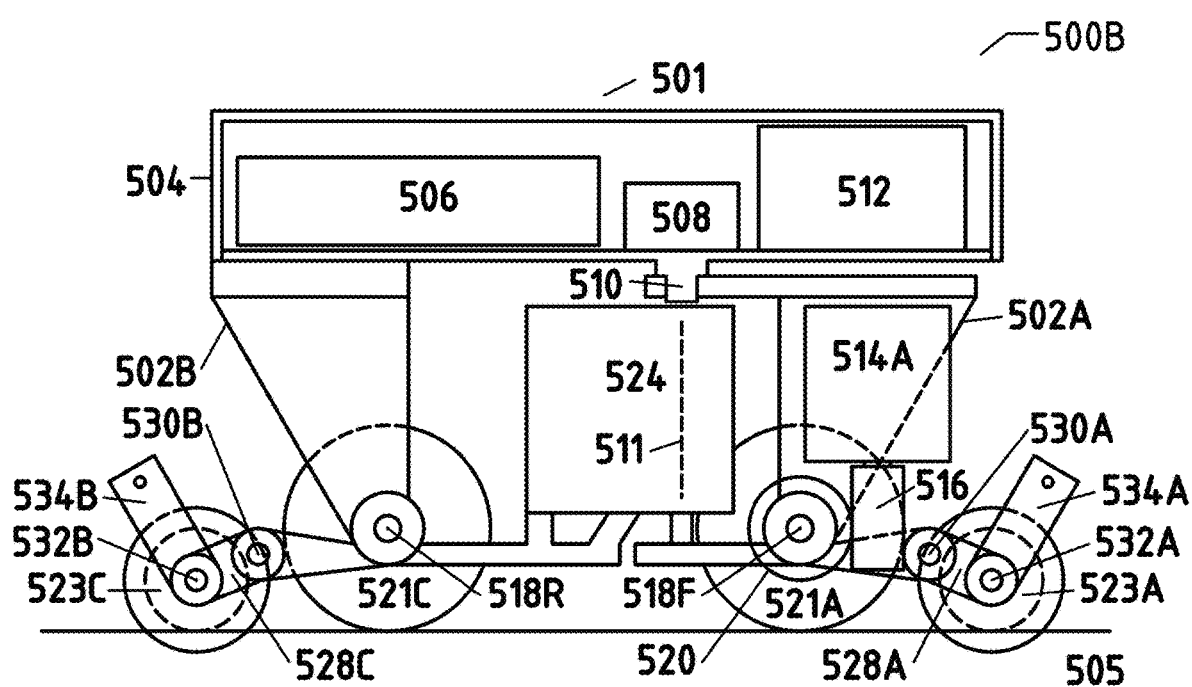
FIG. 5B is a sectional side view of an eight wheel H-vehicle with steering that is used for both rail and road travel.

Description FIG. 5B

FIG. 5B is a sectional side view 500B of an 8 wheel H-vehicle with steering that is used for both rail and road travel. This vehicle can be used with the junction illustrated in FIG. 2A. The H-vehicle has separate road wheels and rail wheels. It contains most of the same elements of FIG. 5A except the rail wheels 522A-D have been replaced with road wheels 521A-D (521B and 521D not illustrated) and swing arms 528A-D raising and lowering rail wheels 523A-D. The swing arms 528A-D pivot around pivot axles 530A-B which are attached to the chassis halves 502A-B. Rail wheels rotate around rail wheel axles 532A-B which are attached to the swing arms 528A-D. Swing arm actuator motors (not illustrated) are attached to pivot arm levers 534A-B.

H-vehicle 501 is illustrated as riding on a rail 505 with rail wheels 523A-D (523B and 523D not illustrated) lowered by swing arms 528A-D. The road wheels 521A-D are riding on top of rail 505. Articulated steering is accomplished by a servo motor rotating chassis haves around a vertical pivot line 511. The four rail wheels are lowered using a pair of swing arms rotating around horizontal pivots. Rail wheels are lowered when the vehicle is on the track and elevated when the vehicle is on the road. Two separate servo motors are used on the model to raise and lower the rail wheels. These servos are not illustrated. Rail wheel pairs may be raised and lowered together or separately. Traction on rails can be provided by allowing road wheels to contact the tops of the rails, as illustrated, or rail wheels can be driven.

Alternately, traction can be applied to both rail and road wheels. Two or four wheel drive can be used.

Figure 5C:
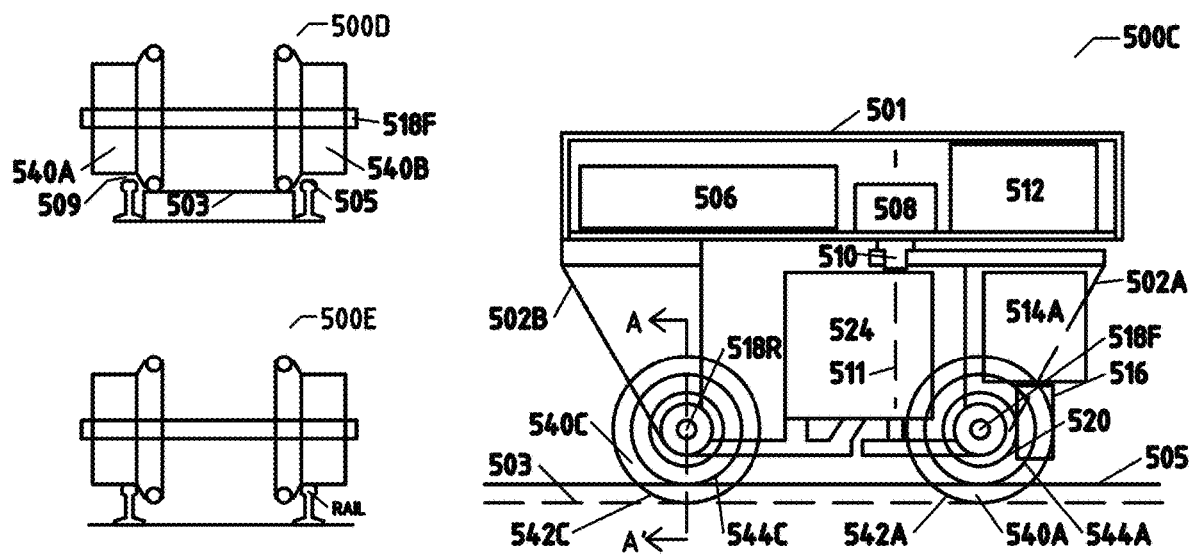
FIG. 5C are side and section views of a four wheel H-vehicle using combination wheels and riding on rails.

Description FIG. 5C

FIG. 5C are side and section views 500C of a four wheel H-vehicle using combination wheels 540A-D and riding on rails. The vehicle is similar to FIG. 5A except for the combination wheels 540A-D are used in place of rail wheels 522A-D. Combination wheels 540A-D (540B and 540D not illustrated) have rubber wide road wheel tips 542A-D and hard tread surfaces 544A-D.

Two sectional A-A' views are taken. View 500D illustrates the vehicle being supported by a junction floor 503. View 500E illustrates the vehicle being supported on rail 505. The left top sectional view 500D illustrates the combination wheels receiving support from the junction floor 503. Note the small gap 509 between the rail and the rail wheel tread. The left lower sectional view illustrates the tread on combination wheels getting rail support with the road wheel tips (tires) unsupported.

Figure 5D:
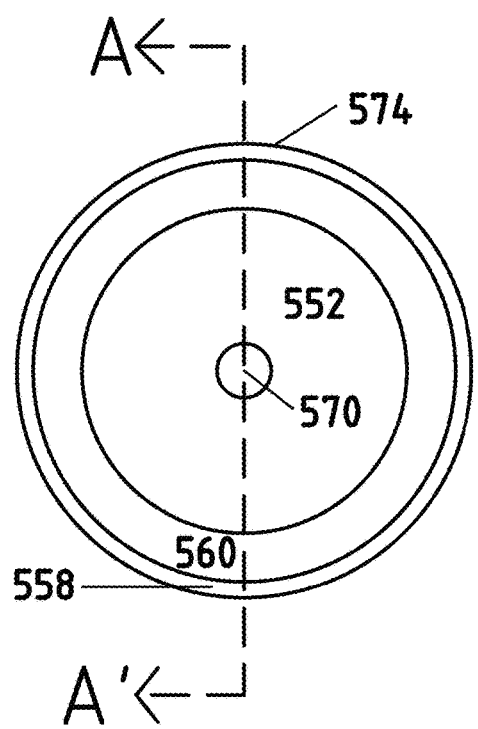
FIG. 5D are side and section views of a locked combination wheel.
Figure 5D:
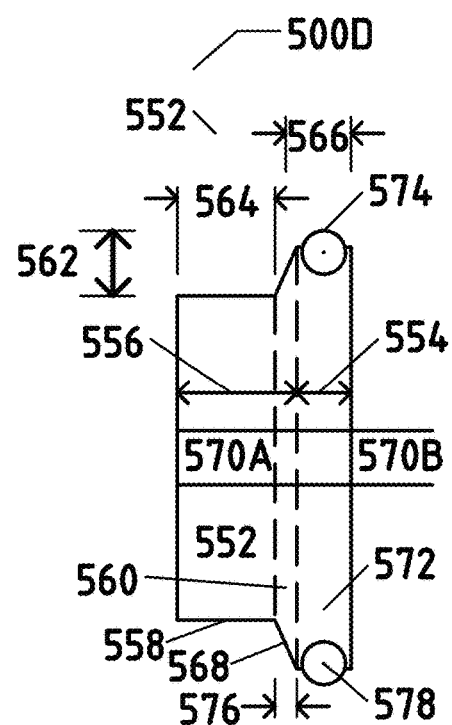

Description FIG. 5D

FIG. 5D are side and section views 500D of a locked combination wheel 552. The combination wheel has road wheel parts that rotate at a same angular velocity as rail wheel parts and are concentric. The figure illustrates the simple rail combination wheel 552 that has two parts. There is a road wheel part 554 and a rail wheel part 556. The road wheel part 554 has a rim 572 and a flange tip with a tire 578. It can also be called a road wheel tip 574 and can be rubber or made of whatever material is located on the top or bottom of a road wheel. The road wheel part 554 has a road wheel width 566.

A rail wheel part 556 has a (slightly tapered) cylindrical part called a tread 558 with a width 564 and a flange 560. The flange has a height 562, a flange width 576, and an angular surface 568. An axle 570 can be considered to have two parts, a rail wheel axle 570A and a road wheel axle 570B. In this figure they are locked together.

This road wheel part 554 does not damage pavement because of the tire 578 on the road wheel tip. The angled flange surface 568 makes contact with the inside of a rail or a side bar on a transition span or a junction to generate lateral force. The tread width 564 may be wide or narrow (conventional). A wide thread is used to prevent a rail wheel from dropping into a rail gap by receiving support from an adjacent rail top. When an elevated flange support surface is used, the tread may optionally be narrow because wheel support is provided by an elevated flange support surface contacting the road wheel tip (tire). Likewise the tread width 564 may be wide or narrow, depending on application.

Thus a combination wheel has a road wheel part and a rail wheel part. On a road, in a transition span or in a junction, the road wheel tip supports the vehicle. On a rail, the tread of the rail wheel provides vehicle support.

Description FIG. 5E

FIG. 5E are side and sectional views 500E of an unlocked combination wheel 572. The purpose of an unlocked combination wheel is to allow a road wheel tip 598 to rotate slower than the rail wheel tread 576, avoiding skidding or slippage when moving into or out of a junction. A central shaft 578 supports a rail wheel 580 with a flange 582 having an angular flange side surface 584 and a tread 586. The central shaft also mounts a pulley A 588A connected with a belt or a chain 580A to a left motor pulley 592A. The pulleys' belts are illustrated as dashed lines. The central shaft 578 is inserted into an outside shaft 594 to which a road wheel rim 596 is attached. The rim mounts a tire 598 (road wheel tip) made of elastic material. The central shaft 578 also mounts a pulley B 588B which is connected to a right motor pulley 592B via a belt or chain 580B.

The outside shaft 594 is supported by a bearing 599 which is attached to a chassis or suspension, not illustrated. A variable speed reversible motor 581 rotates the motor pulleys. Because pulley 1 and pulley 2 have different diameters, the outside shaft rotates 594 at 0.667 times the rotational velocity of the central shaft 578. Note that required angular velocity ratios depend on wheel sizes and how far the junction floor is located below the rail top surface. Two vehicles with different ratios between R2 and R1 should use different gear teeth ratio sizes or pulley size ratios for a same junction.

This embodiment may also be implemented with gears in place of belts or chains. Also motors and gears can be located inside a combination wheel.

Other methods of making an unlocked combination wheel include separate motors on road wheel and the rail wheel parts, freewheels, planetary gears, and clutches.

On a planetary gear, the ring may be driven, the sun gear locked (or fixed or held) and the planet carrier is used for a reduced speed takeoff, which is the road wheel.

A single motor with two output shafts can also be used. The two shafts can be coupled mechanically (e.g. with gears) or they can be coupled magnetically. For example, one output shaft can use four poles in the rotor and the other can use six poles in the rotor while rotating inside a same stator.

Use of a freewheel would allow a road wheel to decelerate faster when it contacts a junction floor.

A clutch would allow road and rail wheels to be decoupled when their rotational velocity diverges.

If a brushless motor is used on a locked combination wheel, another technique is to very rapidly change the drive frequency to the motor when rotational speed needs to rapidly change. A motor controller can be sent a "speed-up" or "slow-down" signal from a junction sensor. Motors can be either radial or axial flux designs.

Generally if wheel slip is going to occur on locked combination wheels, steel-to-steel slip is preferable to rubber on cement because you do not want to leave rubber on a junction's pavement. Both the road and rail wheels will tend to slip when first providing support for a vehicle.

Another method of eliminating skidding is to put a roller at the entrance and exits to a junction in place of an up-ramp. The roller is situated at right angles to the direction of R-vehicle travel. A locked wheel vehicle arriving into a junction can reduce its locked combination wheel's speed while the vehicle is supported by the roller.

Another method of eliminating skidding is to use a flexible driveshaft, such as one containing a torsional spring. As a wheel decelerated the spring would absorb energy and give the energy back when accelerating.

A differential gear set can be used between a drive shaft, a road wheel and a rail wheel if the road wheel is in contact with the road, the rail wheel is in contact with the rail. A limited slip differential may be used.

Figure 6:
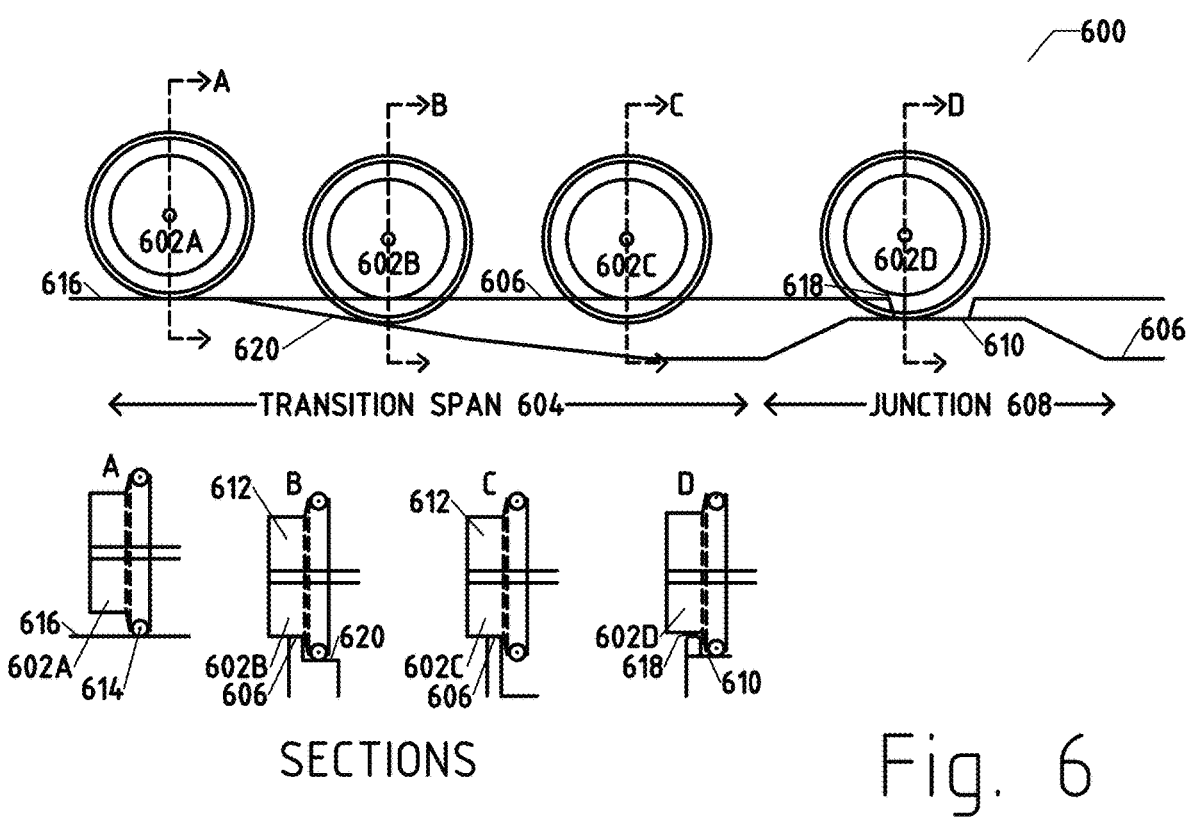
FIG. 6 is set of four side and four sectional views of a moving combination wheel.

Description FIG. 6

FIG. 6A is set of four side and four sectional views 600A of a moving combination wheels 602A-D. The combination wheel is going from a road 616 to a transition span 604 onto a rail 606 and then passing over a junction 608 with a junction floor 610. On the left are four side views of the locked or unlocked combination wheel 602A-D mounting the rail on the transition span 604 by moving to the right. In position A the wheel 602A is traveling on the road 616 and the vehicle's weight is supported by the rubber tires comprising a road wheel tip 614.

In position B the wheel 602B is transitioning onto the rail 606 and the vehicle's weight is transferring from being supported by a transition span floor 620 and rubber tires 614 to being supported by the rail and tread portion 612 of the (steel or other material) rail wheels. This is where slippage may occur for a locked combination wheel.

In position C the rail 606 and rail wheel treads 612 are supporting the weight of the vehicle. The known disadvantage of this combination wheel is the different relative speeds between the road wheel tip and the tread, which causes slippage when getting onto or off of a rail if using a locked combination wheel.

In position D the wheel 602D is passing through a junction and the road wheel is lifting the rail wheel slightly off of the rail a small distance "gap" 618, which may be less than 1 cm. for full scale. There will also be a slight wheel elevation change which may be concealed by a vehicle's suspension. Another option is to have the vehicle travel level and have the tops of the rails in a transition span go up and down to avoid a combination wheel's elevation change.

Transition Spans

Figure 7C:
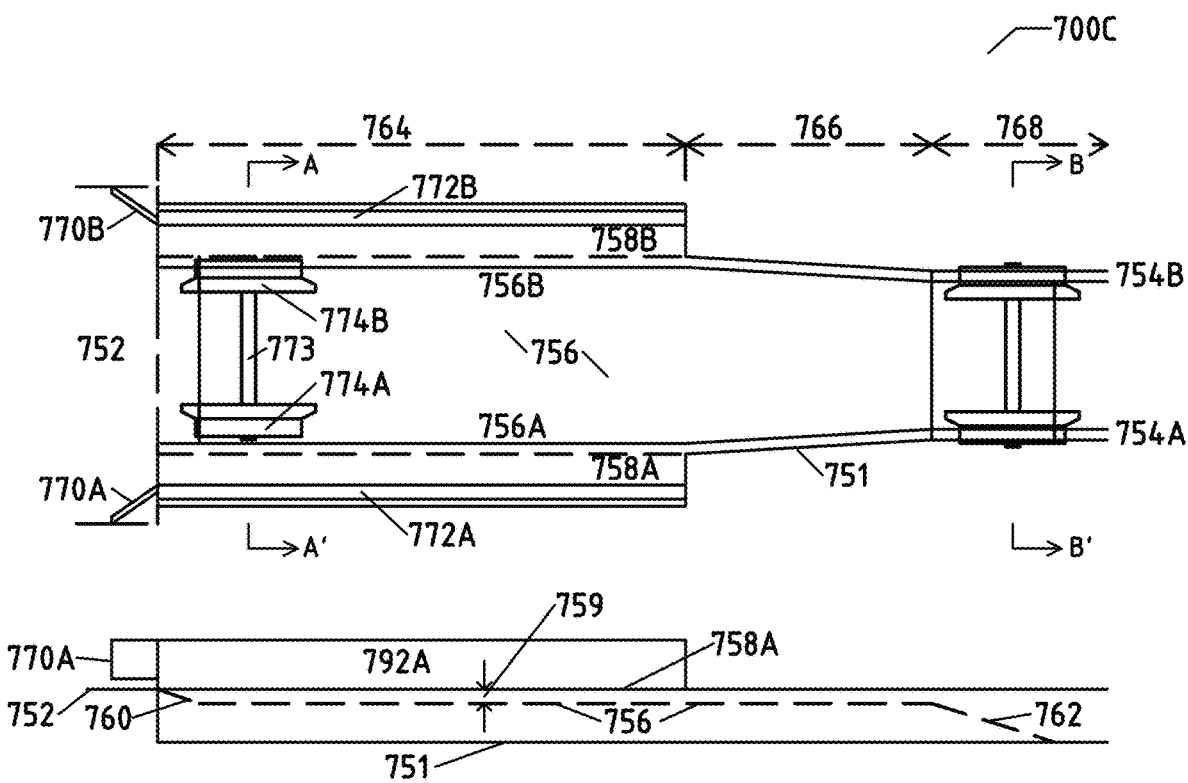
FIG. 7C are top and side views of third mechanical transition span.

A transition span connects a road, which is essentially a flat surface and two rails with standard gauge spacing. With a current state of automobile vehicle steering technology and developments in machine vision, lasers, sensors, guide wires, LIDAR, digital signal processing (DSP), microwave signals, computers, and digital communications, transition spans may be used that electronically guide an H-vehicle onto a set of tracks. Illustrated in FIG. 7A is an H-vehicle that simply steers as it moves forward to mount a rail. Or as it backs onto a rail, for that matter. This may be implemented with a set of rails that simply rise up out of a road or sink back into a pavement. In this application, a transition span's function is to provide a safe location to mount a rail without cross traffic interference and preferably without stopping. Mechanical guide systems are also illustrated in FIGS. 7B and 7C. In connecting to a rail, fishplates or metal connecting bars may be used to attach a transition span structure to the rails.

Description FIG. 7A

FIG. 7A are top and side view 700A of a first electronic assist transition span 711. The span has been shortened for illustration. The transition span 711 can be used to electronically connect a road 702 and a conventional set of tracks 704 using a vehicle's steering using pivot 708 for combination wheel 718A-D alignment. This embodiment can be used with the vehicles illustrated in FIG. 3A, 3B, 3C or 3D. Vehicles are mounting rails 712A and 712B by moving to the right. The combination wheels 718A-D steer to align a left H-vehicle 710A with the set of rails 712A and 712B that are rising out of a ground surface (road) 702, which can be pavement. Sleepers (railroad ties) have been omitted for clarity. The transition span 711 connects to rails 712A-B at rail joint 713. Two or four wheel steering can optionally be employed on the H-vehicle 710A. Any type of steering can be used, including crab steering. The front wheels of the left H-vehicle 710A are illustrated as over sunken rail tops, while the rear wheels are still on the ground surface road 702. A right H-vehicle 710B is fully mounted on the rail. The left H-vehicle 710A steers using left and right indicator signals 714L-714R in a feedback system as well as distance-to-mount reflectors 728L-R. The signal also indicates deviation-from-centered distances.

Multiple alignment systems are illustrated and discussed.

In a first method, machine vision alignment is used employing camera 716 and computer 724. The camera 716 is mounted on the vehicle looks and is pointing forward, specifically looking for target signals from positions such as the indicator signals 714L-R. The two signals radiate electromagnetic energy at any wavelength. For example, the signals can be one or two light sources (e.g. visible or invisible LEDs or pulsed LEDs) or light from illuminated retro-reflectors 728L-R. The signals are observed by the camera 716 situated on H-vehicle 710A. When the H-vehicle is maneuvered into a correct position, the two lights will be in a correct alignment position in a camera's image, and the rail wheels will be correctly aligned. Use of one or more lights allow adjustments on angle (bearing). Distance can be measured by LIDAR. Retro-reflectors such as the reflectors 728L-R can be used to increase the range of LIDAR which can accurately range distance. When LIDAR is used for distance, and a light separation angle is measured with a camera, both distance and angle is known for positioning.

Machine vision may also be used to identify and track the rails below and ahead.

In a second method a magnetic probe 726 mounted on the front of a vehicle is sensing an AC magnetic field sent out by a sensor wire 720 situated between tracks. The magnetic field can be created by a current loop with current going out the wire and returning through the rail 712A. The current loop can extend out into the road for vehicle pickup at a distance. This principle of operation is used by technicians to locate underground utilities that conduct, such as water pipes, gas lines, or AC power lines. An AC frequency should not be a harmonic of any power source, especially 50 or 60 Hz. The magnetic probe 726 can use Hall effect sensors to discern magnetic field vector direction and strength.

In a third method, an antenna 722 can be receiving radiated Geo-location signals from a stationary local site signal source (not illustrated). A computer 724 can process the signals and provide steering/driving commands. The antenna and computer can also process command and control communications with a remote TCS (not illustrated). The radiated geo-location signal source can service multiple nearby transition spans.

In a fourth method a pair of directional radio signals can be used, such as are used by aircraft instrument landing systems (ILS). Two amplitude modulated (AM) carriers with a same carrier frequency and different modulating frequencies, such as 90 Hz and 150 Hz, are used in overlapping beams. Reception of the beams tell a receiving antenna on the vehicle it is headed directly towards a target rail or if is to the left or right by the relative amplitudes of the AM side-bands. Radio carrier frequencies should be much higher than aircraft applications because a range is much shorter and higher precision is needed. A frequency in the tens of giga-Hertz is appropriate, plus directed beam forming can be made tighter at microwave frequencies with short wavelengths. A receive antenna is located on the H-vehicle and transmit antenna(s) (not illustrated) with beam forming are located ahead of the H-vehicle. Phased arrays may be useful for beam forming. Beams may also be multiplexed in the time domain. The beams may use suppressed carrier signals.

In a fifth method a laser beam shines down the track for vehicle alignment. The H-vehicle would simply keep the laser beam in the center of sensor optical cross-hairs as it moves forward. The laser could be located between the rails or over a rail, but snow/ice buildup is a design consideration.

A sixth method can achieve alignment when a first laser beam shining down from the vehicle 710A is reflected from a rail top while an adjacent laser beam misses the rail top and hits the ground to the left or right.

In a seventh method, one or plural retro-reflectors in an array can be placed ahead on the track and used as an alignment target by lasers on the vehicle. The lasers can be part of a LIDAR scanner.

In an eighth method, magnetic sensors on the vehicle can be placed above the steel track. These can operate on the principle used by metal detectors where an oscillator changes frequency or a sensing coil's loss increases (Q-factor) in the presence of metal. These detectors can operate around frequencies of 100-300 kHz.

In a ninth system, mechanical or capacitive probes can be used to "feel" or sense the track to change steering.

If there are multiple entry tracks, guide signals may distinguish themselves by frequency or other signal characteristic. Thus, a vehicle can be commanded by a TCS to enter a particular lane or enter a queue.

Systems that allow entry to curved tracks also exist for aircraft flight paths. Design is simplified if H-vehicles can travel straight onto the tracks, not at an angle. Real estate track availability and other design considerations may not always allow this.

In general, radio wave solutions have a design weakness of reflected signals causing interference and misalignment. They can also be attenuated by moisture with higher frequencies being better for accuracy but more sensitive to rain or snow. Magnetic solutions have a weakness to stray ferrous metal causing a distortion of magnetic fields. Optical solutions have a weakness of beam blocking including dirty lenses and snow/ice covering. Track heating has been used in the past to remove snow.

With combination wheels, a road wheel part steers as it moves forward until the rail wheels' flanges engage the tracks. With separate road and rail wheels, the road wheels align the rail wheel flanges over the slot (flange paths) into which they will drop. Using computer-aided vehicle steering in place of a mechanical mechanism to align vehicles with tracks is simpler, but may not be appropriated for some applications, such as third-world countries without advanced technology. It may not be appropriate for seldom-used locations with no available maintenance or power.

The embodiments of FIGS. 7B and 7C both rely on mechanical means for mounting rails. But may be assisted by electronic means.

In another embodiment, rails can run horizontally and road wheel support pavement underneath gradually drops.

Trolley (or street cars) rail tops run at street level. This transition span may also be comprised of roads containing trolley rails to track transition spans.

Where the tracks rise out of the pavement the tracks may be spaced with a slightly larger gauge than standard, by a few centimeters. A conventional flange width rail road wheel will tolerate a slightly wider gauge and automatic alignment is made easier.

The eight-wheeled H-vehicle (e.g. FIG. 3B) can lower its rail wheels as soon as alignment and rail wheel flange clearance above the road is achieved.

The rail tops may flare (become wider) near the ground entrance to facilitate alignment.

In an alternate embodiment, a camera on the transition span can scan an approaching H-vehicle and command it what to do. The commands can be via radio signals to computer 724 or visible signals intended for a human driver.

In the transition span a TCS should securely communicate with an H-vehicle to verify such details as toll payment, sufficient battery charge to reach destination, good mechanical conditions, vehicle not reported as stolen etc.

Description FIG. 7B

FIG. 7B are top and sectional views 700B of a second transition span 731 that can be used to mechanically align a vehicle on a road 732 with rails 734A-B. A road inlet is on the bottom and a rail outlet is on the top. The vertical scale has been compressed for illustration. Only an axle 744 with a pair of combination wheels 742A-B is illustrated. The combination wheels need to be centered to mount combination wheel treads 743A-B onto the tops of rails 734A-B. When moving from the road to the transition span 731 a road wheel tip 736 on the combination wheel 742A-B makes a first contact with a transition span's floor 746. The road wheel tip 736 is illustrated as a rubber tire on a combination wheel 742A-B, but there are other embodiments. For example, a road wheel tip can be wide or narrow, elastic or hard. Road wheel tips can be situated on a combination wheel as illustrated, or narrow and hard as illustrated on the rail wheel in FIG. 3A. A surface of the floor 746 can be manufactured treated to improve traction or heated to melt ice and snow.

The wheel of FIG. 5E also can be used. The eight wheeled embodiments of FIG. 3D and FIG. 3B also works, but the rail wheel part must be lowered before mounting the rails 734A-B. Side bars 740 are first contacted by a wheel's flange angled surfaces 738. This forces the axle and vehicle to a span center so that, as it moves forward, wheels 742A-B align with the rails 743A-B. A small gap 748 between the side bars and the wheels' tread prevents wheel contact with the side bar tops while inside the transition span. As the wheels roll down an optional ramp 747 the rail wheel tips go unsupported, and the treads 743A-B make contact with the tops of the rails 734A-B.

Wide or narrow treads 743A-B may be used on combination wheels 742A-B. Wide treads are not required for a transition span, but are accommodated.

Going from rail to road is just the reverse process. Vehicles can also be backed onto a rail. Vehicles can be steered in a transition span to avoid contact with the side bars, and electronic guidance methods can also be used with electronic transition spans. The transition span 731 can be operated with an up-tilt, a down tilt or level.

Only a single wheel set with an axle with a pair of combination wheels is illustrated. The wheel set has rolled in from the bottom and is resting on a floor and it is not centered, but shifted to the left. The floor is a flange support surface. As the wheel set rolls forward towards the rails, the flanges' angled surfaces contact the insides of side bars forcing the wheel set into center. Transition span 731 is very tolerant of entry vehicle misalignment, both rotational and translational.

Description FIG. 7C

FIG. 7C are top and side views 700C of third mechanical transition span 751. It is used to mechanically align H-vehicles coming from roads 752 onto rails 754A-B. The transition span connects to the road on the left and to the rails 754A-B is on the right.

The transition span 751 has a wide gauge section 764, a gauge transition section 766 and a standard gauge section 768

The span 751 has a pair of road wheel support surfaces 758A-B and a pair of flange support surfaces 756A-B. The flange support surface 756A-B is situated below the road wheel support surface 758A-B by a height 759 that is slightly less than a flange height e.g. 562. This transition span can be used by multiple H-vehicle wheel configurations including embodiments illustrated in FIGS. 3A-D and 5E. It is illustrated with an axle 773 and two locked narrow flange combination wheels 774A-B.

A 4-wheel vehicle pulls onto the transition span 751 and the road wheel tip of the combination wheel goes down a first ramp 760 connecting the road 752 to the flange support surface 756 in the wide gauge section 764. At this point a road wheel tip of the combination wheel 774A-B can be supported by the flange support surface 756A-B, or the (wide) tread portion of the rail wheel 774A-B can be supported by the road wheel support surfaces 758A-B. The H-vehicle moves forward into the gauge transition section 766 and is forced into a center. As it leaves the gauge transition section 766 it is aligned. The H-vehicle moves into the standard gauge section 768 and a second ramp 762 drops. This removes support for the road wheel tips and the H-vehicle moves onto rails 754A-B supported by wheel treads.

To assist an H-vehicle's road wheel entering the transition span a funnel 770A-B is provided. To keep road wheels of a poorly-steered vehicle in the transition span 751 a pair of gutters 772A-B are used.

Figure 7D:
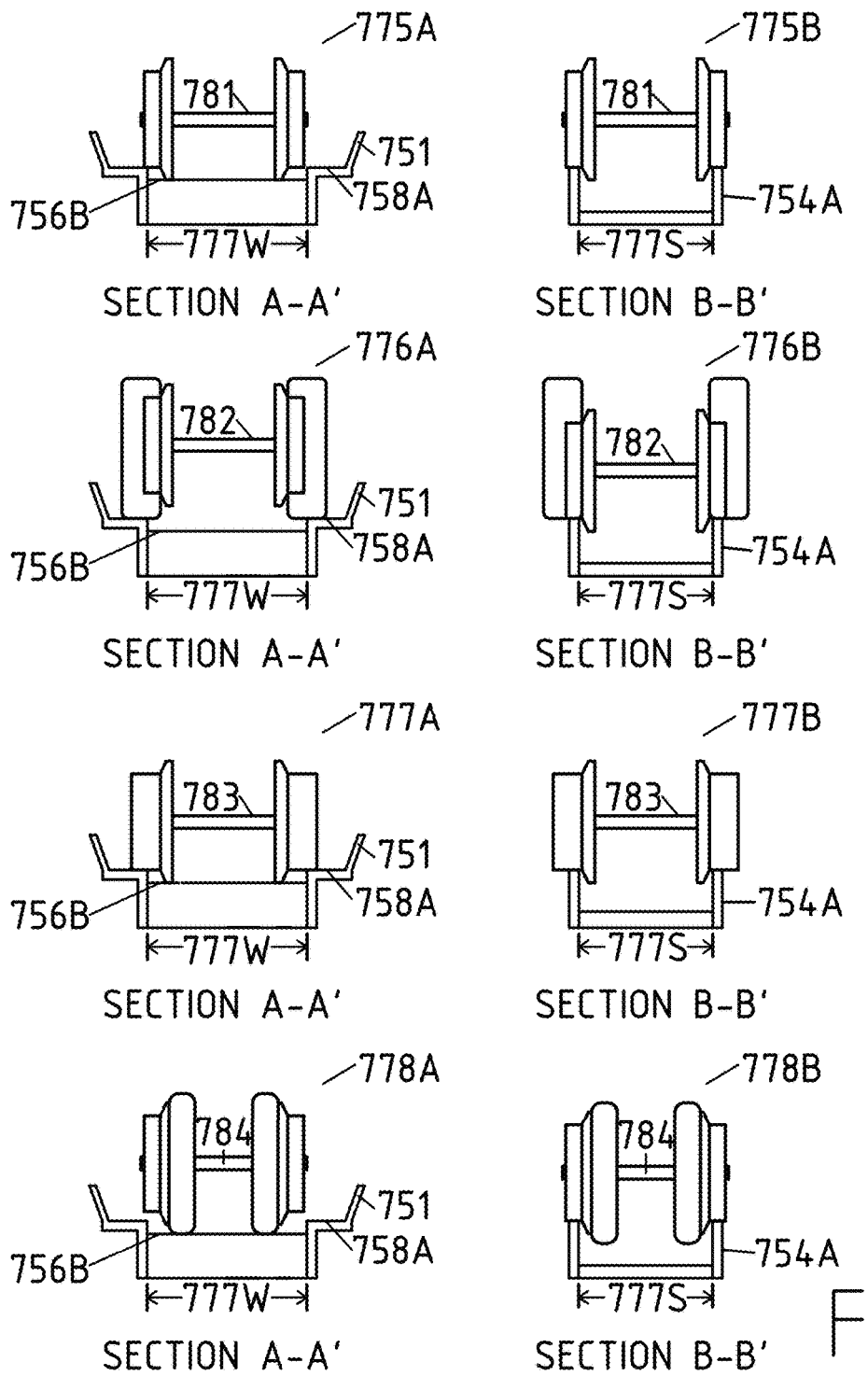
FIG. 7D are eight section views of FIG. 7C showing wheel set positions.

Description FIG. 7D

FIG. 7D are eight sectional views 775A-B to 778A-B of FIG. 7C showing wheel set positions.

All H-vehicle wheel embodiments can work with all transition spans, but standards need to be set for interoperability, safety, automation, speed, and inclement weather conditions.

A first set of sectional views 775A-775B (A-A' and B-B') illustrates combination wheel sets 781 with narrow flanges and narrow treads. In a wide gauge section 777W the flange tips support the wheels on flange support surfaces 756B. In the standard gauge section 777S the tread supports the wheels on the rails 754A-B.

A second set of sectional views 776A-B (A-A' and B-B') illustrates separate road wheels and rail wheels sets 782. The axle has been omitted from the road wheel set for the sake of illustration. In the wide gauge section 777W the road wheels are supported by road wheel support surfaces 758A-B. In the standard gauge section 777S the treads supports the wheels on the rails 754A-B. One or more road wheels can optionally contact the rail tops to provide traction for acceleration or braking.

An 8-wheel vehicle moves onto the wide gauge section 764 with its rail wheels up. Its road wheels are supported by the road wheel support surfaces 758A-B. Next rail wheels are lowered and the H-vehicle moves forward. The rail wheels' angled flange surfaces press against effective side rails created by a height difference 759 between flange support surfaces 756 and road wheel support surfaces 758A-B. This forces the H-vehicle into alignment as it moves through the gauge transition section 766 and onto rails 754A-B in the standard gauge section 768. Traction can be supplied by road wheels or rail wheels.

Optionally road wheels can be completely lifted off of rail tops and traction/breaking can be supplied by rail wheels.

A third set of sectional views 777A-B (A-A' and B-B') illustrates a wide-tread combination wheel sets with narrow flanges 783. In the wide gauge section, 777W, the road wheel tips can be supported by flange support surfaces 756B or the treads can be supported by the road wheel support surfaces 758A-B. In the standard gauge section, 777S the tread supports the wheels on the rails 754A-B.

A fourth set of sectional views 778A-B (A-A' and B-B') illustrates a narrow tread combination wheel with wide road wheel tip. Axle 784A with a pair of combination wheels is illustrated. The wheels need to be centered to mount rail wheel parts onto the rails 754A-B. In the wide gauge section 777W the road wheels tip is supported by flange support surfaces 756B. In the standard gauge section 777S the wheel's tread supports the H-vehicle on the rails 754A-B.

When moving from the road 752 to the transition span 751 the road wheel (flange) tip on the combination wheel makes a first contact with a transition span's flange support surface 756.

Thus, transition span 751 can support a variety of H-vehicle wheels with differing flange width and differing road wheel tip widths.

Figure 8A:
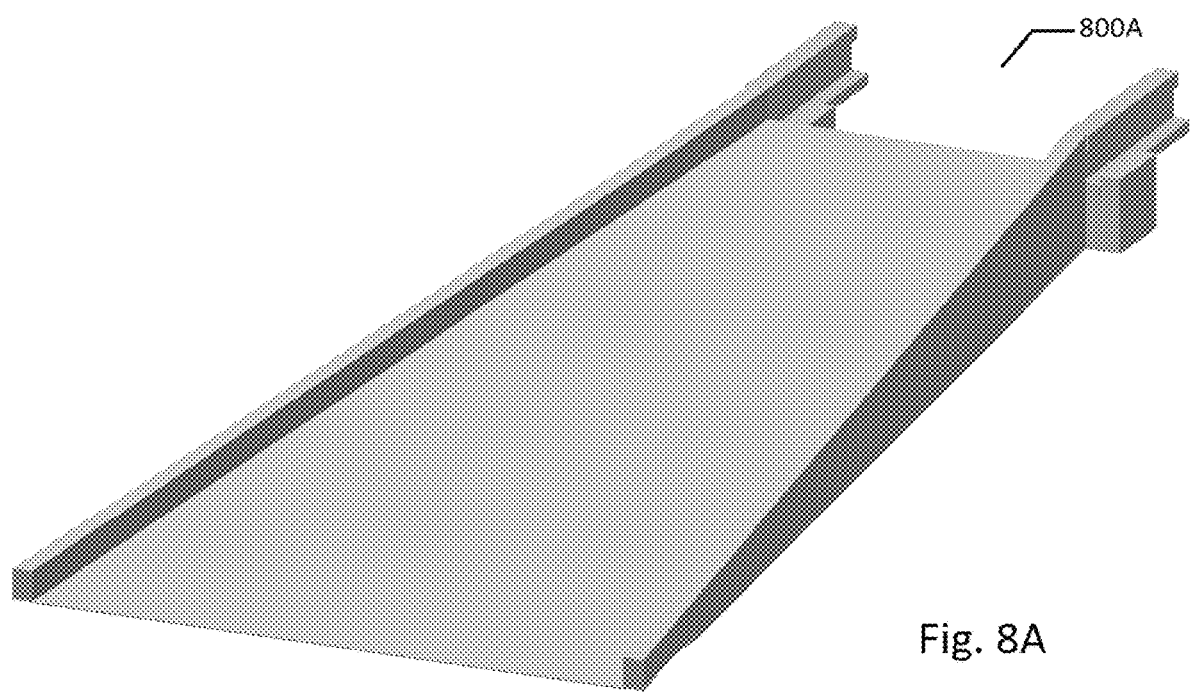
FIG. 8A is a perspective view of a transition span illustrated in FIG. 7B.

Description FIG. 8A

FIG. 8A is a perspective view 800A of the transition span illustrated in FIG. 7B. It may be used by all four wheeled vehicles. It may also be used by eight-wheeled vehicles, such as illustrated in FIG. 3B with the rail wheels lowered and providing traction. The upper right side of the transition span connects with a standard gauge rail and the lower left side to a road. The entrance gauge width may be wide, such as twice the rail gauge. The exit gauge width aligns with rails and can be a standard rail gauge. On both sides are side bars which may be contacted by the angled flange surfaces of combination wheels or rail-only wheels to force vehicle alignment towards the center.

This transition span may be used with human operator steering or electronically assisted e.g. as discussed in discussion FIG. 7A.

Figure 8B:
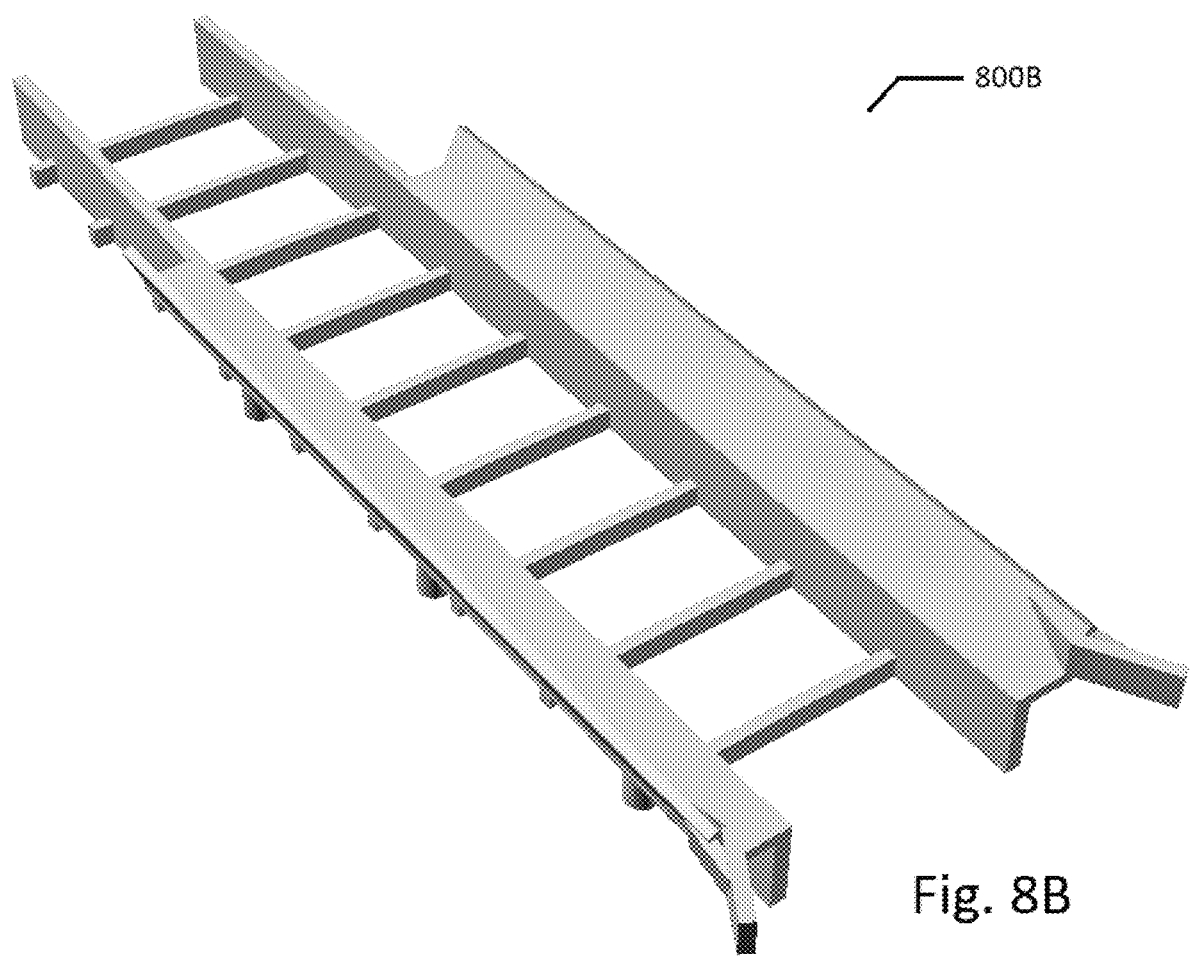
FIG. 8B is a perspective view of a transition span illustrated in FIG. 7C.

Description FIG. 8B

FIG. 8B is a perspective view 800B of a transition span illustrated in FIG. 7C. It may be used by all H-vehicles. The transition span's flange support surface, similar to item 756, is not illustrated (removed) to show ties (sleepers). The lower right side of the transition span is connected to a road side and the upper left side connects to a standard gauge rail.

The transition span allows eight wheeled H-vehicles illustrated in FIGS. 3B and 3D to enter from the road side and to switch between road travel and rail travel by lowering rail wheels. An H-vehicle going towards a rail can either lower rail wheels while on the transition span, or it can raise its road wheels. Four wheeled H-vehicles with combination wheels can enter the transition span from the road supported by road wheel tips on the flange support surface and exit said transition span supported by rail wheel treads on rail tops.

A transition span may have a gauge that starts wide for a vehicle mounting the transition span from the road, and then it narrows to a standard rail gauge as the vehicle moves towards a standard gauge rail. The transition span also features an optional gutter or side rail which may be angled.

The gutter aligns the rail vehicle's wheels to approximately center the vehicle over the transition span. This compensates for imprecise or sloppy driving. Another optional feature is funnel bars (funnels) situated on the road side of the transition span. The funnel can be used to additionally align the road wheels going into the transition span. Optionally a roller with a vertical axis can be used in place of a funnel to contact wheels for better alignment. A ramp may be used on the road side to compensate for elevation changes, or the transition span may be tilted.

Description FIG. 9

FIG. 9 are side and section views 900 of a vehicle 910 with two electromagnet rail brakes 902A-B. The brake 902A illustrated on the left is de-energized and the brake on the right 904B is energized. This drawing illustrates electromagnets 904A-B with an inverted U-shaped ferrous core which are attracted to a ferrous rail 906 when electricity is applied to a coil 916. The coil's wire is illustrated with a hatch. The vehicle 910 has two rail wheels 918B-C illustrated. Two vertical slide pins 908A and 908B are attached to the chassis of the vehicle 910 and go into two guide holes in an electromagnet holder 914. The electromagnet holder is attached to and guides the electromagnet up or down towards the rail 906. The electromagnets 904A-B can slide up and down on slide pins, with an up-force being applied by a spring (not illustrated) and a down-force being applied by magnetic attraction between the ferrous rail and the electromagnet. Between the electromagnet and the rail 906 is a brake pad 920 that may use a friction surface that may be metallic, ceramic, or organic. The coil 916 on said electromagnet 904A-B is connected to a power source (battery) 922 and a switch 924. The power source may be AC or DC. When the electromagnet 904B is activated by closing said switch, the electromagnet 904B is pulled down by magnetic force, pinching the brake pad 920 between the electromagnet 904B and the rail 906, stopping the vehicle. Braking force may be increased with the application of more coil current. When the current is stopped, the electromagnet 904A is pulled up off the rail by spring force.

This electromagnet could only be energized in an emergency, but it could be used for normal operations. Normal operation may be while going downhill, preventing a runaway.

This brake can be used to supplement rail wheel braking on all rail vehicles, not just rail vehicles of the present invention. Excessive braking force could damage a rail or rail joints by stretching (tensile force). Brakes should not be applied over a rail gap.

Alternate Embodiment, Features, Design Details and Advantages

1. A hybrid vehicle can mount a rail from a road crossing in the same way a conventional Hi-Rail vehicle mounts. This typically occurs where a road crosses the rail. Cameras, sensors and laser pointers can be used to facilitate manual or automatic alignment. This is not as safe, secure or quick as using a transition span. Instead of an abrupt drop-off at a road crossing, road edges in the road crossing can ramp down for vehicle alignment, forming a transition rail.
2. Any existing self-driving car technology can be used if appropriate. In particular parallel parking techniques can also be used to position a hybrid vehicle either over a rail at a road crossing or in the center of a transition span.
3. Vehicle wheel alignment with the rail is forced by moving the hybrid vehicle forward or backwards on the transition span as it narrows to standard gauge.
4. This invention can be used for model/toy or full scale applications. Any type of vehicle application is anticipated, such as no-operator delivery vehicles, trucks, trailers, buses, public and private vehicles, trucks and lorries. The hybrid vehicles can be owned by individuals and the rail may be public or private. It can be used for Personal Rapid Transit systems.
5. Dynamically variable traction and/or weight distribution on road or rail drive wheels can be used for better traction, lower rolling resistance or improved braking. For example, if the rail surface is slippery it may be advantageous to put more weight on a traction road wheel. If the rail surface is not slippery, it may be advantageous to lower rolling resistance by shifting the weight to a rail wheel.
6. Vehicle weight may be partially or fully borne by the rail wheels while on rails.
7. Steerable rail and road wheels allow tighter turning radius while on both roads and rails.
8. Travel over transition span can be made with or without the hybrid vehicle stopping.
9. It is dangerous to get outside of vehicles when mounting a rail, so automatic operation using sensors, cameras, computers and actuators is anticipated.
10. Vehicles may also back into a transition span.
11. A traffic control system (TCS) may control vehicle motion when mounting and exiting a transition span.
12. Road wheels may be any type, including wheels suitable for off-road.
13. Instead of road wheels, continuous track, also called tank tread or caterpillar track, can be employed.
14. Two closely spaced lasers may be used to check track for alignment. One laser reflects off of the top of the track and the other misses the track top when alignment is achieved. Three lasers can also be used to bracket a rail.
15. Grooves in a road can provide flange clearance. Pavement (or rails) adjacent to the grove can supply wheel support. Trolleys effectively use this type of track in streets.
16. As a design feature, the rail or road wheels can retract up underneath the body of the vehicle for aesthetics or improved aerodynamics.
17. Pairs of rail wheels may be situated in front of or behind road wheels, in front or middle of vehicle.
18. Either the rail wheels or the road wheels may be lifted.
19. Sensors can detect vehicle position in a transition span and signal an H-vehicle to drop rail wheels.
20. A golf cart chassis can be used for rail vehicle construction or hybrid vehicle construction. The width of a golf cart chassis allows room for combination wheels on 1435 mm. gauge track. This can make a low-cost demonstration system using abandoned track and a transition span.
21. Differential gears can be used to compensate for a problem of different right and left wheel speed, which is increased on tight corners. Alternately, the wheels may be driven independently, as by different traction motors.
22. Getting off of a set of rails is generally much easier than getting on because alignment is not required to lift the rail wheels, but alignment is required for dropping the rail wheels. Thus, a vehicle can just drive off of the end of a rail, the rails can sink into the pavement, or a vehicle can lift its rail wheels at a road crossing. The latter situation can occur when roads are paved over abandoned rail road tracks.
23. Other types of steering can be employed.
24. Other railway vehicle uses and configurations are anticipated.
25. Connecting vehicles, such as towed trailers or additional hybrid vehicles is anticipated. H- and R-vehicles can be used for towing. A road-rail trailer is given lateral force at junctions by a vehicle or animal pulling it in a desired direction.
26. Forming vehicles into trains is anticipated. A vehicle in the "train" can supply power or traction for the train vehicles. For example, batteries can be located in a towed rail vehicle, so instead of waiting for a battery recharge, a fresh battery vehicle can be exchanged. Tracks can supply power for traction and battery recharge.
27. Hybrid rail vehicles can also be used for switching yard operations or towing.
28. A vehicle with exceptionally narrow or wide road wheels that is going onto a transition span can communicate with a traffic control system that can adjust parameters on the transition span, such as gutter or funnel spacing. Likewise non-standard larger or smaller vehicles can be accommodated with different design transition spans. In other words, a transition span for a semi-trailer can be different than one for a compact car.
29. Vehicles entering or exiting a rail portion can enter a serial or parallel queue. A parallel queue allows emergency vehicles to go to a head of the queue.
30. A passive switch can also be called a Holtzman switch, or a "switchless switch". The latter seems like a contradiction. A conventional switch has moving blades doing the switching. The passive switch does not have moving blades.
31. Suspensions between the hybrid vehicle chassis and road/rail wheels are anticipated. The rail wheels may share a common suspension with the road wheels, or they may have a separate suspension.
32. A top of a steel rail can be "roughed-up" to improve traction, particularly when contacting a rubber wheel. For example, the top of the steel rail can be sandblasted or knurled. Contact with a steel rail wheel will wear down the roughed-up area, but that can have only a slight effect with a rubber road wheel because the rubber wheel will make contact with a greater area of the rail than a steel rail wheel. Roughed-up rails can be used for steep inclines. Sand can also be used to improve traction, particularly for steep inclines or icy conditions.
33. For-hire vehicles can be summoned with cell phone apps.
34. All inventions applying to self-driving cars and other vehicles also apply to hybrid rail vehicles both on and off rail.
35. In areas where heavy snowfall or ice is prevalent, it is good practice to put a cover over the transition span keeping the rails clear, similar to covered bridges.
36. A wire can be planted in a path leading up to a transition span. A current can be passed through the wire at a high audio frequency and the magnetic field can be picked up by a vehicle being directed onto a transition span. Utilities use this technology to locate underground conductors, such as telephone or power lines. Different frequencies can be used to guide to different transition spans.
37. Other methods to align a hybrid vehicle in a transition span include lowering guide pins or rollers from a vehicle to go into grooves in a floor of transition span. The groove width narrows as the vehicle moves towards the rails to force alignment.
38. Three way turnouts can also be passive junctions
39. Machine vision system can also be used for on-track steering. The vision system see a track curve ahead and steer into it. GPS coordinates can be used with a memory system to know track curves for different latitude and longitude coordinates.
40. Rubber driveshafts or torsion springs can be used on combination wheels to avoid skidding.
41. Vehicles may operate underground, at grade or elevated.
42. Breaking can be improved by placing a u-shaped electromagnet over the track with a thin brake pad between track and electromagnet. When electric current is applied, it pulls the electromagnet to the track and the brake pad in the middle gets pinched, causing friction, stopping the vehicle faster.
43. In areas with steep inclines, floors can be provided between rails. Vehicles' road wheels can contact a floor for traction. On a steep hill the junction floor may rise up to provide better traction with road wheels than would be provided with rail wheels on rails. Also traction assist devices, such as road tire studs, can improve traction in icy weather.
44. There are also bicycle, tricycle, and motorcycle hybrid vehicle applications. They may be human powered, human assist, or fully powered.
45. Hybrid semi-tractor trailer applications can save road damage. Semi-trailer wheels are converted to combination wheels by an attachment of a hub cap rail wheel using a wide or narrow tread.
46. Side rollers can be used in addition to steering to provide lateral force. This may be important when traction is poor.
47. Another method of transitioning from rail travel to or from road travel is to change out the four rail wheels (e.g. steel) for road wheels (e.g. rubber). The time required to make the change limits applications.
48. On a combination wheel, road wheels and rail wheels can be concentric, and then made non-concentric using a swing arm.
49. Standard wheels on most cars can be exchanged for combination wheels to make an H-vehicle, provided the track gauge fits. Most cars on the roads today have approximately a same width.
50. A Traffic Control System (TCS) can employ fiber optic lines which follow the tracks. The use of fiber optic lines provides high reliability, and radio frequency communications with vehicles and be accomplished with millimeter wave signals. A R- or H-vehicle can provide a mobile Wi-Fi hot spot for providing internet connectivity for passengers' devices.
51. Personal Rapid Transit systems can be built for bidirectional service with a sausage-like rail construction. That is, all tracks are one-way but frequent turn-arounds allow a traveler to get in a vehicle on a one-way track and, in a short distance, make a U-turn travel towards a desired destination. Thus, a track can go East on one side of a street and go West on the opposite side of the street.

52. Polyurethane may be used for rail wheels where noise or weight is a factor. Also a short circuit between tracks will cause a rail crossing gate to descend, and non-conducting wheels prevent the short circuit, if that operation is desired.

I claim:

1. A road to rail transportation system comprising a road, a set of standard rails with rail tops, a transition span connecting the road and the standard rails, the transition span having a floor and side bars with a same gauge as the standard rails on a rail end and a wider gauge on a road end,
   a hybrid vehicle with combination wheels comprised of a road wheel part with first contact surfaces for contacting the road and the floor and a rail wheel part with second contact surfaces for contacting a sidebar top and the standard rail top, and a flange angled surface on said rail wheel part for contacting said side bars, said rail wheel part having a smaller radius than the road wheel part, said rail wheel part disposed distal from the road wheel on said hybrid vehicle, wherein said vehicle rolls into the road end of said transition span supported by the road wheel part contacting said floor and rolls out of said transition span onto the standard rails contacting the rail wheel part.

2. A road to rail system according to claim 1 further comprising said road wheels parts and said rail wheel parts are concentric and rotate at a same angular velocity.

3. A road to rail system according to claim 1 further comprising said road wheel parts and said rail wheel parts are concentric and rotate with different angular velocities.

4. A road to rail system according to claim 1 further comprising said road wheels and said rail wheels change relative elevations in said transition span.

5. A road to rail system according to claim 1 further comprising a transition span using electronic sensing of radiated electromagnetic radiation or a magnetic field to direct said hybrid vehicle to mount said rail using steering.

6. A road to rail system according to claim 1 further comprising a transition span using side bar contact with flange angled surfaces to assist said hybrid vehicle to mount said rail using steering.

7. A road to rail transportation system according to claim 1 further comprising a passive junction in said track, said vehicle determining junction output path by applying lateral force by steering said vehicle.

8. A road to rail transportation system according to claim 1, further comprising a passive junction having alpha, beta, gamma, delta, epsilon, and zeta rails with their rail tops at essentially a same level, flange paths, and rail vehicles with rail wheels comprised of a flange, tread, and flange tip that apply lateral force by wheel steering to choose an output path coming out of said junctions.

9. A rail system according to claim 8 where rail wheels have wide treads.

10. A rail system according to claim 8 where all said rail wheels have wheel flange tips that are supported by flange support surfaces in said flange paths while in said junction and are supported by rail wheel treads on standard rails while on said rails outside of said junctions.

11. A road to rail transportation system according to claim 1, further comprising a passive junction having alpha, beta, epsilon, and zeta rails with their rail tops at essentially a same level, a flange support surface situated in said passive junction below said rail tops, rail wheels with wheel flanges, wheel treads and wheel flange tips, said diameter of wheel flange tips is greater than diameter of wheel treads, rail vehicles that apply lateral force by steering to choose direction when coming out of said junctions, where the rail vehicles are supported on their wheel flange tips contacting said flange support surface while in the junction and supported by their wheel treads contacting said rails outside of said junction.

12. A rail system according to claim 11 where combination wheels are used, said combination wheels comprised of a road wheel part and a rail wheel part disposed distal from the center of said vehicle.

13. A rail system according to claim 11 wherein side rollers contacting outsides of standard rails in said junction also apply lateral force.

14. A rail system according to claim 1 where side rails are standard rails rising out of a pavement.

15. A rail system according to claim 1 further comprising a hybrid vehicle that is a golf or utility cart with road wheels modified with an addition of a rail wheel part, said rail wheel part comprised of a flange and a tread, said rail part situated distal from a center of the vehicle making combination wheels, where said cart travels contacting said road wheels while on the road, and travels contacting said rail wheels parts while on said rails.

16. A rail system according to claim 1 where said rail wheel parts are comprised of a flange, a tread, and a flange tip, where said flange tip contact surface may be wide and comprised of an elastic material for travel on road surfaces and transition spans.

17. A rail system according to claim 1 where said rail wheel parts are comprised of a flange, a tread, and a flange tip, where said flange tip contact surface may be narrow and comprised of a hard material for travel across flange support surfaces in junctions and transition spans.

18. A rail system according to claim 1 where a raised floor is inserted between rails on steep inclines or declines to contact road wheels to improve traction.

19. A road to rail transportation system comprising a road, a set of standard rails with rail tops, a transition span connecting the road and the standard rails, said transition span having a wide gauge section, a gauge transition section and a standard gauge section, said transition span having road wheel support surfaces and effective sidebars with a same gauge as the standard rails on a rail end and a wider gauge on a road end, said effective sidebars extending below said road wheel support surfaces by height difference,
   a hybrid vehicle with four road wheels, four rail wheels, wherein said vehicle rolls into the road end of said transition span with road wheels contacting road wheel support surfaces, lowers the rail wheels relative to the road wheels so that a tread portion of the rail wheel makes contact with said rail tops, and rolls out of said transition span with the rail wheels contacting said rail tops.

20. A road to rail system according to claim 19 further comprising a flange wheel support surface making contact with road wheel flange tips while in said transition span.

21. A road to rail system according to claim 19 further comprising the rail wheel producing traction while contacting said standard rails.

22. A road to rail transportation system according to claim 19, further comprising a passive junction having alpha, beta, gamma, delta, epsilon, and zeta rails with their rail tops at essentially a same level, flange paths, and rail vehicles with rail wheels comprised of a flange, tread, and flange tip that apply lateral force by wheel steering to choose an output path coming out of said junctions.

23. A rail system according to claim 22 where rail wheels have wide treads.

24. A rail system according to claim 22 where all said rail wheels have wheel flange tips that are supported by flange support surfaces in said flange paths while in said junction and are supported by rail wheel treads on standard rails while on said rails outside of said junctions.

25. A road to rail transportation system according to claim 19, further comprising a passive junction having alpha, beta, epsilon, and zeta rails with their rail tops at essentially a same level, a flange support surface situated in said passive junction below said rail tops, rail wheels with wheel flanges, wheel treads and wheel flange tips, said diameter of wheel flange tips is greater than diameter of wheel treads, rail vehicles that apply lateral force by steering to choose direction when coming out of said junctions, where the rail vehicles are supported on their wheel flange tips contacting said flange support surface while in the junction and supported by their wheel treads contacting said rails outside of said junction.

26. A rail system according to claim 25 where combination wheels are used, said combination wheels comprised of a road wheel part and a rail wheel part disposed distal from the center of said vehicle.

27. A rail system according to claim 25 wherein side rollers contacting outsides of standard rails in said junction also apply lateral force.

* * * * *